United States Patent [19]
Murrow et al.

[11] Patent Number: 5,302,961
[45] Date of Patent: Apr. 12, 1994

[54] ANTENNA APERTURE WITH MAINLOBE JAMMER NULLING CAPABILITY

[75] Inventors: David J. Murrow, Clifton Park; Kai-Bor Yu, Schenectady; Moayyed A. Hussain, Menands, all of N.Y.

[73] Assignee: General Electric Co., Moorestown, N.J.

[21] Appl. No.: 997,466

[22] Filed: Dec. 28, 1992

[51] Int. Cl.$^5$ .......................... G01S 5/02; G01S 13/00
[52] U.S. Cl. ..................................... 342/427; 342/149
[58] Field of Search ................ 342/427, 149, 153, 154

[56] References Cited

U.S. PATENT DOCUMENTS

| | | | |
|---|---|---|---|
| 3,953,857 | 4/1976 | Jenks | 343/705 |
| 4,028,710 | 6/1977 | Evans | 342/374 |
| 4,150,378 | 4/1979 | Barton | 342/107 |
| 4,219,816 | 8/1980 | Schenkel et al. | 342/149 |
| 4,734,700 | 3/1988 | Brunner | 342/373 |
| 5,030,960 | 7/1991 | Bartley | 342/427 |
| 5,162,804 | 11/1992 | Uyeda | 342/373 |

OTHER PUBLICATIONS

"Combining Sidelobe Canceller and Mainlobe Canceller for Adaptive Monopulse Radar Processing," patent application Ser. No. 07/807,548 (GE Docket No. RD-20,251), filed Dec. 16, 1991, by Yu et al.

"Adaptive Digital Beamforming Architecture and Algorithm for Nulling Mainlobe and Multiple Sidelobe Radar Jammers While Preserving Monopulse Ratio Angle Estimation Accuracy," patent application Ser. No. 07/807,546 (GE Docket No. RD-19,509), filed Dec. 16, 1991, by Yu et al.

"Simultaneous Sidelobe and Mainlobe Radar Jamming Canceller for Adaptive Monopulse Processing," patent application Ser. No. 07/912,398 (GE Docket No. RD-21,283), filed Jul. 13, 1992, by Yu et al.

"Design of Monopulse Antenna Difference Patterns with Low Sidelobes," E. T. Bayliss, The Bell System Technical Journal, May-Jun. 1968, pp. 623-647.

"Representation of Continuous Circular Aperture as a Set of Discrete Rings for a Prescribed Radiation Pattern," M. A. Hussain, W-T Lin, M. McKee, IEEE Transactions on Magnetics, vol. 27, No. 5, Sep. 1991, pp. 3872-3875.

"Design of Line-Source Antennas for Narrow Beamwidth and Low Side Lobes," T. T. Taylor, I-R-E Transactions-Antennas and Propagation, Jan. 1955, pp. 16-29.

"Synthesis of Sum and Delta Beams for Continuous Circular Apertures for Monopulse Processing," M. A. Hussain, K-B Yu, B. Noble, Conference Proceedings, 8th Annual Review of Progress in Applied Computational Electromagnetics, Mar. 16-20, 1992, pp. 234-238.

"Numerical Solution of an Aperture Antenna Integral Equation," M. A. Hussain, B. Noble, W-T Lin, B. Becker, Transaction of the Seventh Army Conference on Applied Mathematics and Computing, ARO Report 90-1, Feb. 1990, pp. 1-16.

Antenna Theory and Design, Chapter 6 "planar arrays: analysis and synthesis," Robert S. Elliott, pp. 196-274, (1981).

"Design of Circular Apertures for Narrow Beamwidth and Low Sidelobes," T. T. Taylor, I-R-E Transactions-Antennas and Propagation, Jan., 1960, pp. 17-22.

*Primary Examiner*—Gregory C. Issing
*Attorney, Agent, or Firm*—W. H. Meise; C. A. Nieves; S. A. Young

[57] ABSTRACT

A nonrectangular antenna aperture is provided comprising four quadrants for receiving electromagnetic signals. The aperture has the capability to form a predetermined sum beam, a predetermined first difference beam, a predetermined second difference beam, and a predetermined double difference beam so that the product of the first and second difference beams is substantially equal to the product of the sum and the double difference beams.

23 Claims, 21 Drawing Sheets

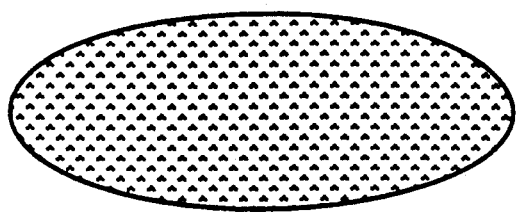
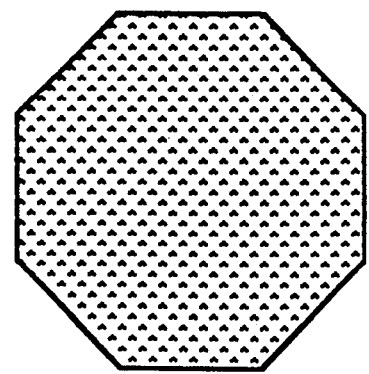
FIG. 10(a)    FIG. 10(b)
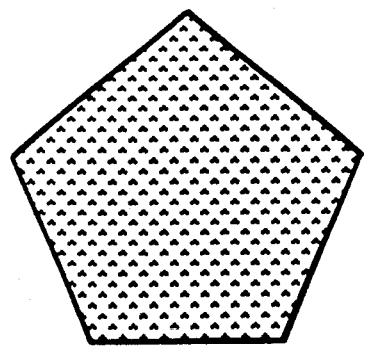
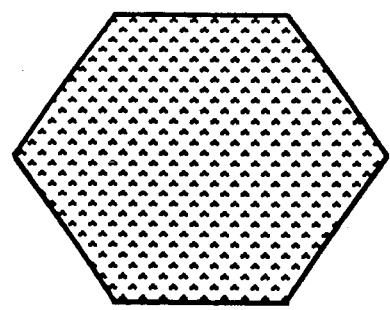
FIG. 10(c)    FIG. 10(d)

ANTENNA APERTURE WITH MAINLOBE JAMMER NULLING CAPABILITY

RELATED APPLICATIONS

This application is related to patent application Ser. No. 07/997,470, entitled, "Antenna Beamformer," by Hussain et al., filed Dec. 28, 1992 and patent application Ser. No. 07/997,468, entitled "Circular Antenna Aperture," by Hussain et al., filed Dec. 28, 1992, both assigned to the assignee of the present invention and herein incorporated by reference.

FIELD OF THE INVENTION

This invention relates to antenna apertures, and, more particularly, to antenna apertures with the capability to cancel mainlobe jammers, such as for use with radars.

BACKGROUND OF THE INVENTION

Phased Array Radar Antennas are described in chapter 7 and advanced ECCM for radars is described in chapter 9 of *The Radar Handbook*, edited by Merrill Skolnik, published by McGraw-Hill Publishing Co. (2d ed. 1990), and herein incorporated by reference. As described in *Monopulse Principles and Techniques*, written by S. M. Sherman, published by Artech House (1984), and in *Monopulse Radar*, written by A. I. Leonov and K. I. Fomichev, and published by Artech House, Inc. (1988), both of which are herein incorporated by reference, monopulse processing for a planar antenna array for radar typically involves the synthesis of sum and delta beams, as is well-known for a rectangular antenna aperture. For a rectangular aperture the beams may also be separable in azimuth and elevation, which is desirable for advanced electronic counter-countermeasures (ECCM) while preserving the monopulse ratio, as described in "Combining Sidelobe Canceller and Mainlobe Canceller for Adaptive Monopulse Radar Processing," patent application Ser. No. 07/807,548, filed Dec. 16, 1991, by Yu et al., "Adaptive Digital Beamforming Architecture and Algorithm for Nulling Mainlobe and Multiple Sidelobe Radar Jammers While Preserving Monopulse Ratio Angle Estimation Accuracy," patent application Ser. No. 07/807,546, filed Dec. 16, 1991, by Yu et al., and "Simultaneous Sidelobe and Mainlobe Radar Jamming Canceller for Adaptive Monopulse Processing," patent application Ser. No. 07/912,398, filed Jul. 13, 1992, by Yu et al., all assigned to the assignee of the present invention and herein incorporated by reference. Presently, various antenna apertures other than rectangular apertures, such as circular antenna apertures, are available for use in radar systems and offer improved performance over rectangular apertures, although such apertures are susceptible to jamming. Examples of such nonrectangular apertures are described in *The Antenna Handbook*, edited by Y. T. Lo and S. W. Lee, and published by Van Nostrand Reinhold Co. (1988). A need exists for an antenna aperture that is less susceptible to advanced ECCM and also provides the improved performance available from nonrectangular apertures.

SUMMARY OF THE INVENTION

A main object of the invention is to provide an antenna aperture for phased array radars other than a rectangular aperture less susceptible to advanced ECCM, such as jamming.

Another object is to provide an antenna aperture for phased array radars, other than a rectangular aperture, in which the monopulse ratio is preserved even after adaptive processing or beamforming.

Briefly, in accordance with one embodiment of the invention, a nonrectangular antenna aperture comprises four quadrants, each quadrant for receiving electromagnetic signals. The aperture has the capability to form a predetermined sum beam, a predetermined first difference beam, a predetermined second difference beam, and a predetermined double difference beam so that the product of the first and second difference beams is substantially equal to the product of the sum and the double difference beams.

BRIEF DESCRIPTION OF THE DRAWINGS

FIGS. 10a, 10b, 10c, and 10d, respectively, illustrate various shapes for alternative embodiments of a nonrectangular antenna aperture in accordance with the invention.

DETAILED DESCRIPTION OF THE INVENTION

Figure 1:
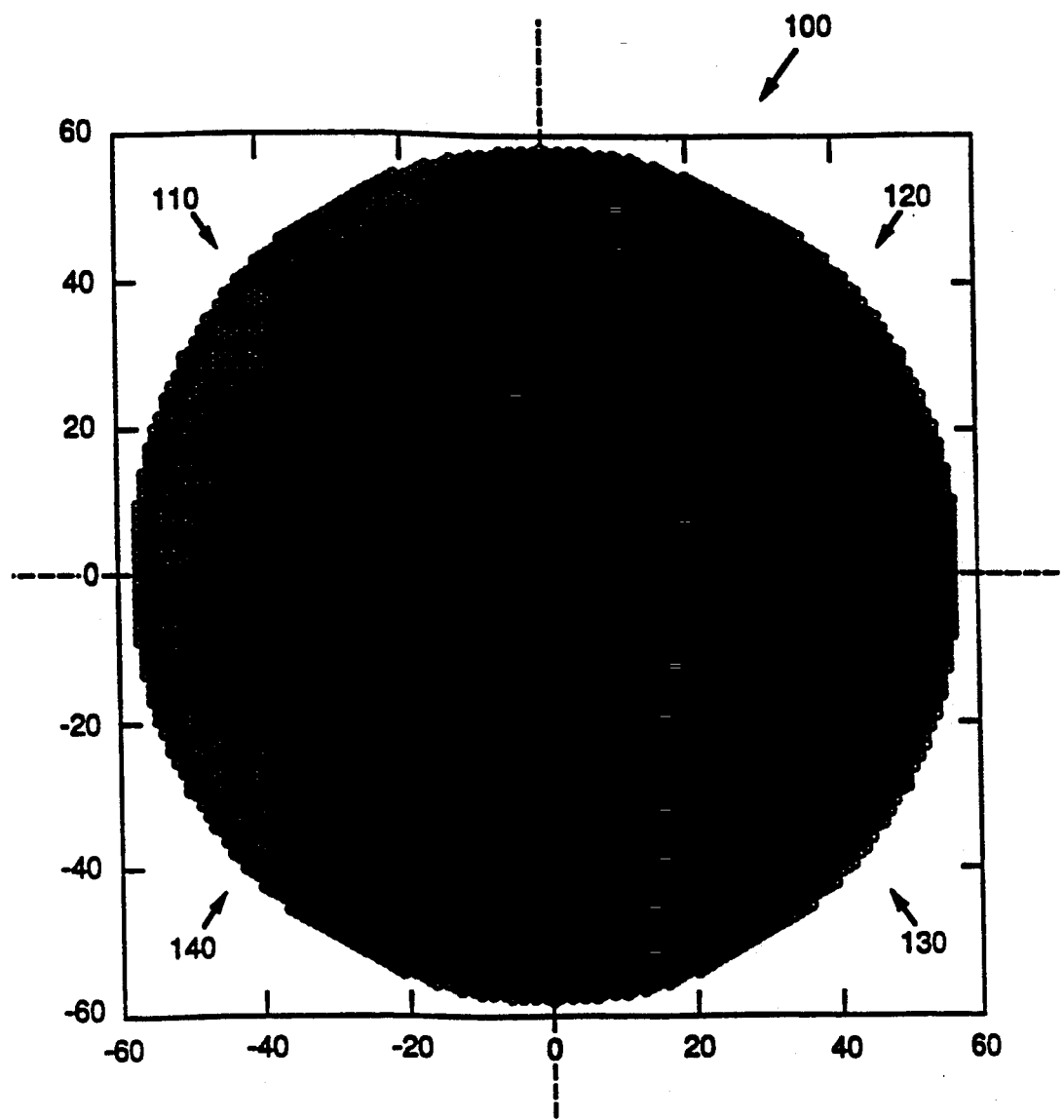
FIG. 1 is a plan view of one embodiment of a nonrectangular antenna aperture in accordance with the invention.

FIG. 1 illustrates an embodiment of a nonrectangular antenna aperture 100, such as a substantially circular antenna aperture, in accordance with the invention. In the context of the invention, "aperture" refers to any surface capable of radiating or receiving an electromagnetic signal or any bounded surface that may act as an electromagnetic signal radiator or receptor. The bounds or edges of the surface of the aperture depend, primarily, upon the electromagnetic fields and currents over the surface. Thus, in the context of the invention the currents outside of the aperture are treated as negligible.

For an embodiment such as an array of antenna elements as illustrated in FIG. 1, the aperture comprises the surface substantially bounded or formed by the edge elements of the array. For the embodiment of FIG. 1, the antenna elements are positioned on a substantially planar surface of the aperture. The aperture illustrated in FIG. 1 may be employed in a phased array radar and adapted for modulating electromagnetic signals either after reception or before signal transmission substantially in accordance with a predetermined illumination distribution defined over the surface of the aperture so that the aperture is responsive to or has the capability to produce electromagnetic signals propagating substantially within a predetermined electromagnetic field radiation pattern.

As illustrated in FIG. 1, aperture 100 is comprised of a plurality of antenna elements, typically dipole horns or slotted waveguides, each having a predetermined position in the aperture. The scale of FIG. 1 provides the relative positions of the elements in units of $\lambda/2$, where $f \cdot \lambda = c$, c is the speed of light, and $\lambda$ and $f$ are the wavelength and frequency, respectively, of the electromagnetic signals to be transmitted or received. The antenna elements may be adapted for modulating the phase and amplitude of electromagnetic signals substantially in accordance with a predetermined illumination distribution. Typically, the aperture either transmits or receives signals having a component substantially in the direction of a directional axis oriented at a predetermined azimuth angle and a predetermined elevation angle with respect to the substantially planar surface of the aperture. Thus, the antenna elements may be adapted for modulating the component of the received signal or the signal to be transmitted. This modulation may be effectuated by the antenna element itself or in conjunction with a device specifically provided for modulating the amplitude and phase of electromagnetic signals, such as current. A number of devices are known to accomplish this modulation, such as waveguides, amplifiers, attenuators, transmitter-receiver modules, active antenna apertures or feed networks for an aperture. Examples of such devices are described in *Radar Applications*, edited by Merrill Skolnik, and published by IEEE Press (1987) and *Aspects of Modern Radar*, edited by Eli Brookner and published by Artech House (1988).

In the embodiment illustrated in FIG. 1, 12,175 elements are positioned in and substantially form aperture 100. Nonetheless, as will be appreciated by one skilled in the art, the invention is not limited in scope to an embodiment comprised of dipole or similar elements for radiating or receiving electromagnetic radiation. Alternatively, for example, the aperture may comprise a single bounded surface for radiating or receiving electromagnetic energy, such as a metal dish or plate for receiving or a horn for transmitting.

As illustrated in the embodiment in FIG. 1, aperture 100 is comprised of four quadrants 110, 120, 130, and 140. The quadrants are successively adjacent in moving from one quadrant to another around the perimeter of the aperture in either a clockwise or counter-clockwise direction. Likewise, 110 and 130 are diagonally adjacent, as are 120 and 140. It will be appreciated that in the context of the invention, quadrant refers to the division of the receiving or radiating face of the aperture into a substantially rectangular coordinate system that typically shall have its origin substantially coinciding with the geometric center of the aperture face. It will likewise be appreciated that although the invention is not restricted in scope to the placement of the axes of this rectangular coordinate system, typically the axes will be positioned so that the aperture is symmetrically about either or each axis, if possible. The antenna elements of aperture 100 are adapted for modulating electromagnetic signals, either before transmission or after reception, so that the modulated signals for each respective quadrant may be substantially coherent or in phase. This modulation, in accordance with one embodiment, may be accomplished in conjunction with a radar antenna beamformer, as described hereinafter. Nonetheless, as previously described, devices for modulating the phase and amplitude of an electromagnetic signal may take any one of a number of forms, such as a transceiver module.

Signals received at or transmitted from the surface of the aperture for each respective quadrant may be modulated so that, depending upon predetermined phase differences, predetermined electromagnetic field radiation patterns are formed or scanned. It will be appreciated that the radiation pattern is defined as a function of angle in azimuth and elevation relative to the aforementioned directional axis oriented at a predetermined elevation and azimuth with respect to the plane of the aperture. As is well-known in the art, the pattern or its directional axis typically changes its orientation during actual operation of the radar through the use of a phased array, such as described in the previously referenced *Radar Handbook*. It will likewise be appreciated that a plurality of predetermined electromagnetic field radiation patterns are typically formed or scanned simultaneously by the use of a radar antenna beamformer because the radar antenna beamformer may have the capability to introduce predetermined amplitude and phase modulations by dividing and superpositioning the currents, or other embodiments of the electromagnetic signals, at the antenna elements either before transmission or after reception.

Figure 3A:
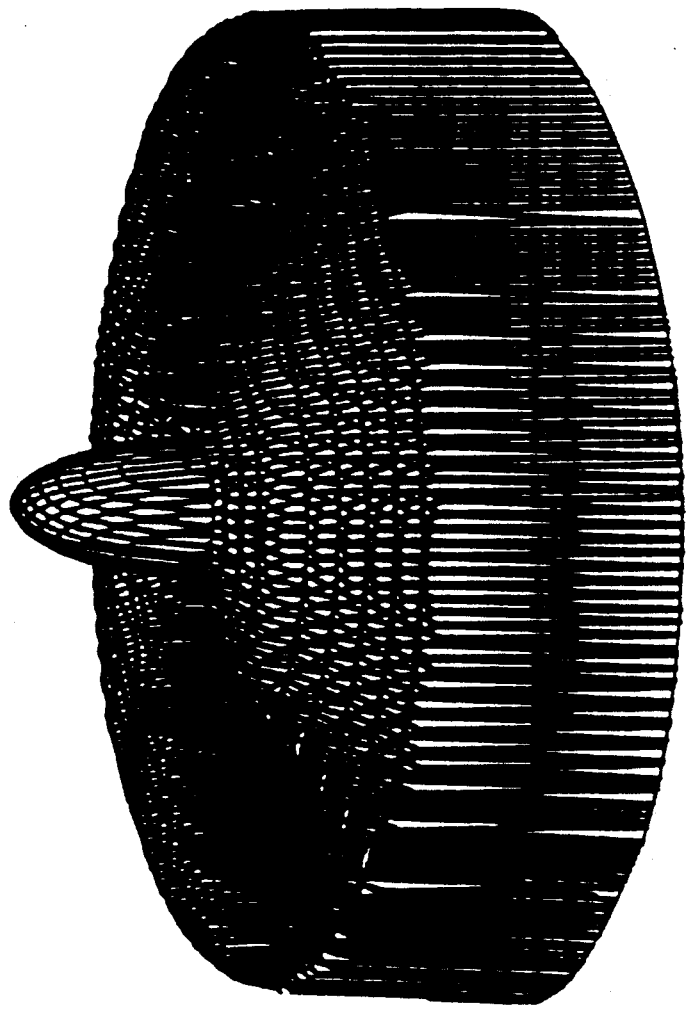
FIGS. 3a, 3b, and 3c, respectively, are isometric views of predetermined electromagnetic field radiation patterns that may be formed by an embodiment of an nonrectangular antenna aperture in accordance with the present invention.

As is well-known in the art, when received or produced electromagnetic signals are modulated in accordance with a predetermined illumination distribution so that the modulated signals in each quadrant are substantially in phase, or coherent, the corresponding predetermined electromagnetic field radiation pattern formed or scanned as a result is typically referred to as the "sum beam." Thus, in the embodiment illustrated in FIG. 1, aperture 100 has the capability to modulate signals received by or transmitted from quadrants 110, 120, 130, and 140 so that the modulated signals are substantially in phase and a sum beam ($\Sigma$) is either transmitted by the aperture or formed upon reception. A sum beam for an embodiment of a nonrectangular aperture in accordance with the present invention has a mainlobe with a level of A and a plurality of sidelobes having predetermined levels. The sidelobe immediately adjacent the mainlobe has a predetermined level of B. Thus, the mainlobe-to-sidelobe ratio of the sum beam formed by an embodiment of an aperture in accordance with the present invention is A/B, where A and B are typically provided in units of decibels. In the context of the invention, the "level of a sidelobe" refers to the highest level of that sidelobe. As will be appreciated, this distinction is useful because any particular sidelobe that surrounds the mainlobe may have any one of many different amplitudes depending on the particular cross-section of the electromagnetic field radiation pattern in azimuth or elevation. An isometric view of the sum beam formed for an embodiment of the present invention illustrated in FIG. 1 is illustrated in FIG. 3a. Cross-sectional views of sum beam electromagnetic field radiation patterns formed by embodiments of the invention are likewise illustrated in FIGS. 4a, and 4e, respectively. For FIGS. 4a, 4b, 4c, 4d, 4e, 4f, and 4g, the horizontal axis is provided in units of standard bandwidth, as defined hereinafter, and the vertical axis is provided in units of decibels. The cross-section of the sum beam illustrated in FIG. 4a may be formed by an embodiment comprising discrete antenna elements, such as the embodiment illustrated in FIG. 1, whereas the cross-section of the sum beam illustrated in FIG. 4e may be formed by an embodiment comprising a radiating or receiving surface.

Figure 4A:
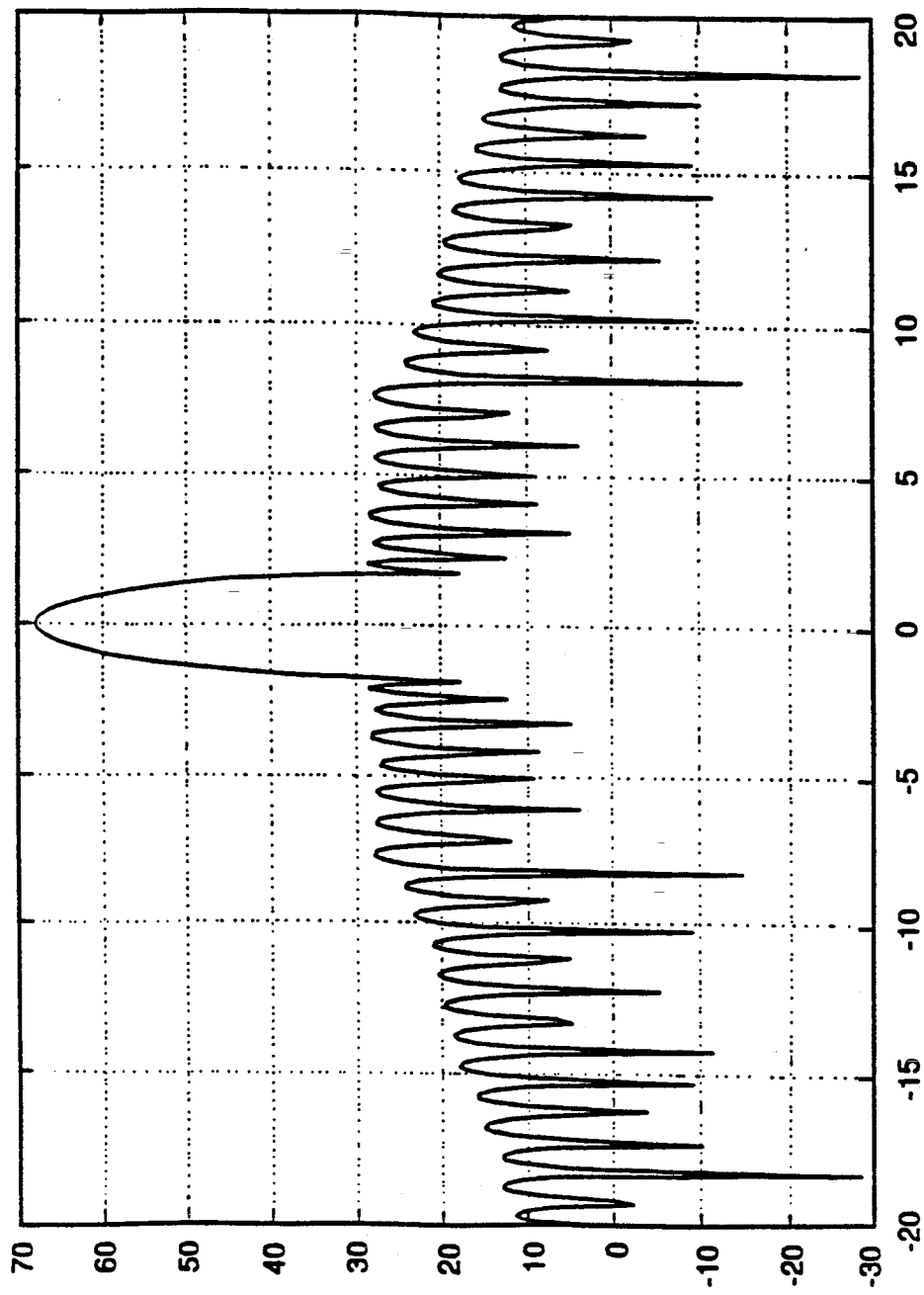
FIGS. 4a, 4b, 4c, and 4d, respectively, are cross-sectional views of predetermined electromagnetic field radiation patterns that may be formed by an embodiment of a nonrectangular antenna aperture in accordance with the invention, such as shown in FIG. 1.
Figure 4B:
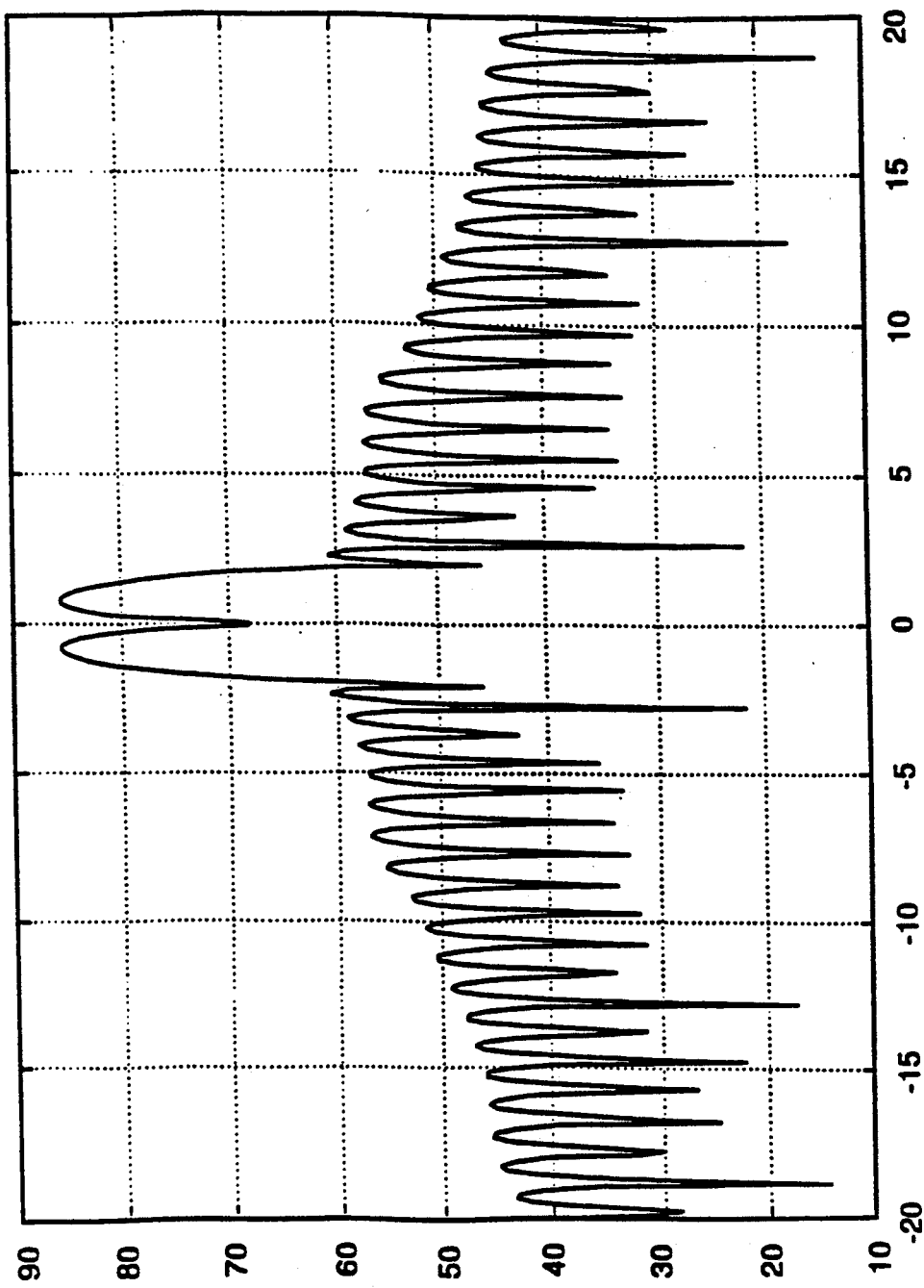
Figure 4C:
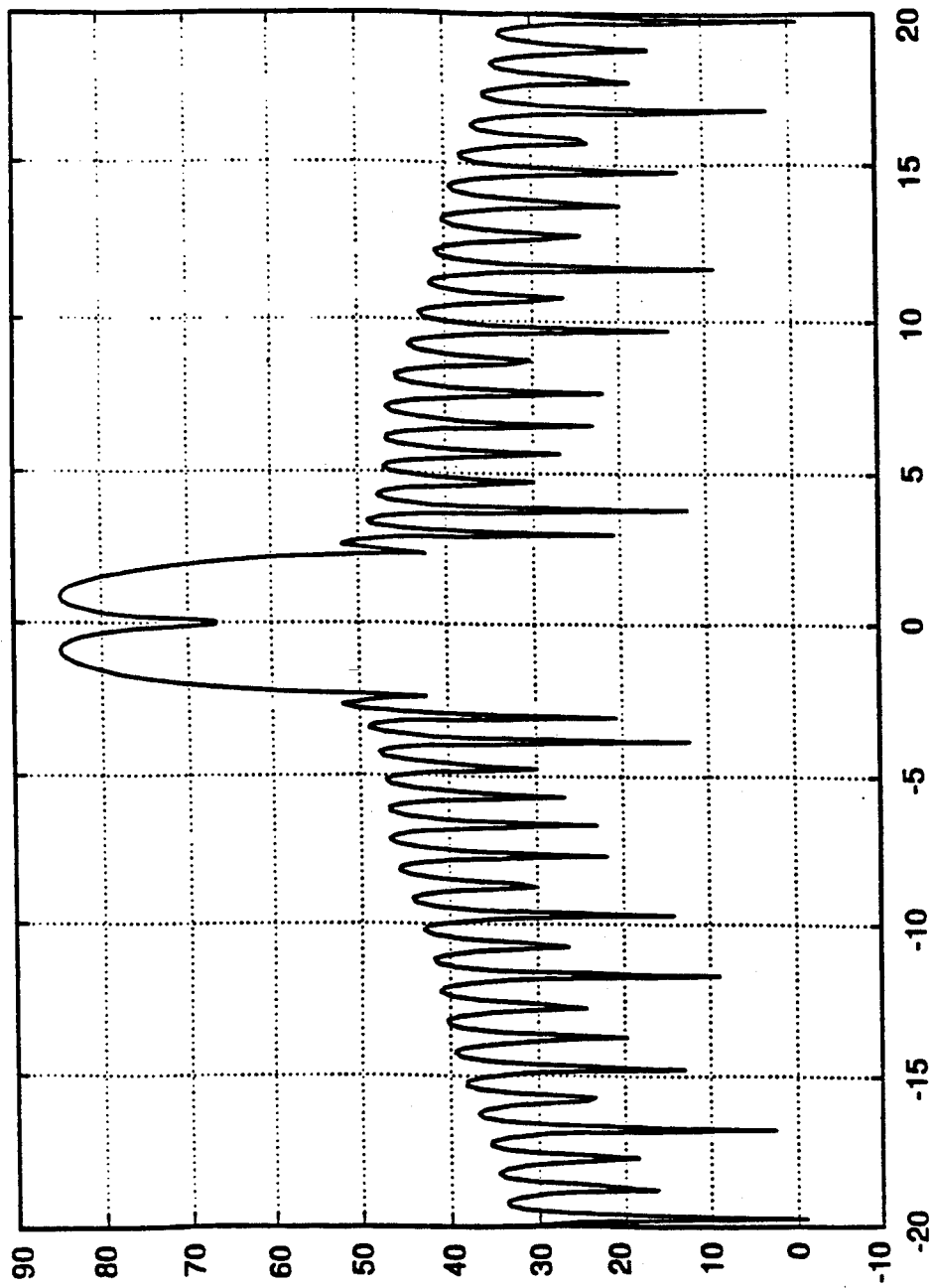

As illustrated, the cross-section of the sum beam shown in FIG. 4a has seven sidelobes adjacent the mainlobe with substantially predetermined levels. Likewise, the sidelobes are chosen to have predetermined levels that are substantially equal, although the use of discrete antenna elements results in some not significant differences between the sidelobe levels due to quantization effects, as illustrated. Nonetheless, as previously described, the invention is not limited in scope to this particular embodiment. Thus, for alternative embodiments of the aperture a sum beam or electromagnetic field radiation pattern may be formed or scanned in which the predetermined levels of the sidelobes are not chosen to be substantially equal. Likewise, for alternative embodiments, the sum beam formed may have only two predetermined sidelobe levels or more than two predetermined sidelobe levels, depending upon the particular embodiment. In general, a great number of sidelobes of predetermined heights results in a more complex illumination distribution. This provides a greater ability to place the nulls or zeros in the electromagnetic field radiation pattern in desired locations and may result in narrower beamwidths without a substantial degradation in the mainlobe-to-sidelobe ratio.

Figure 3B:
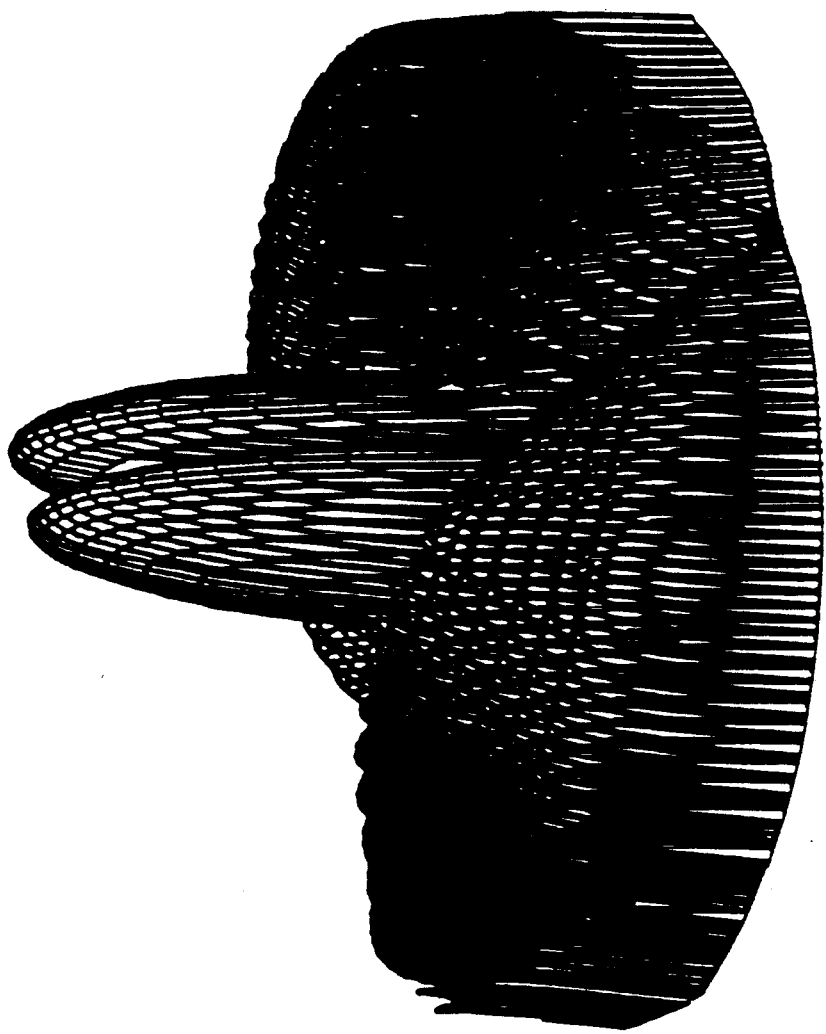
Figure 3C:
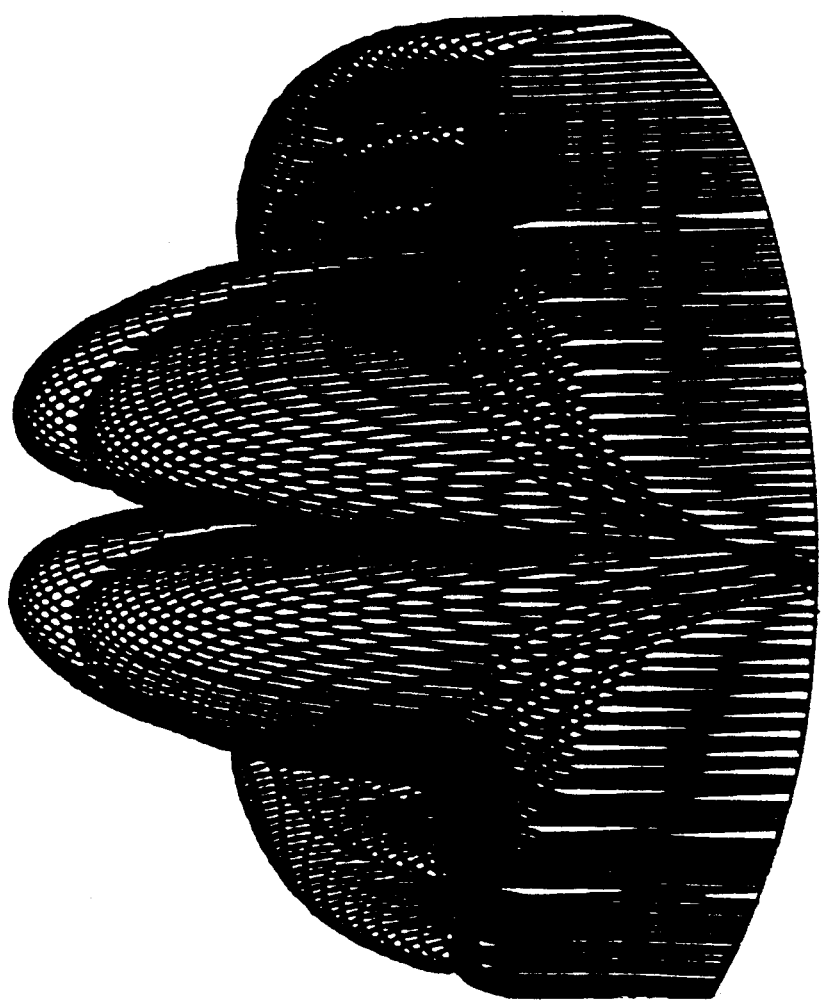
Figure 4D:
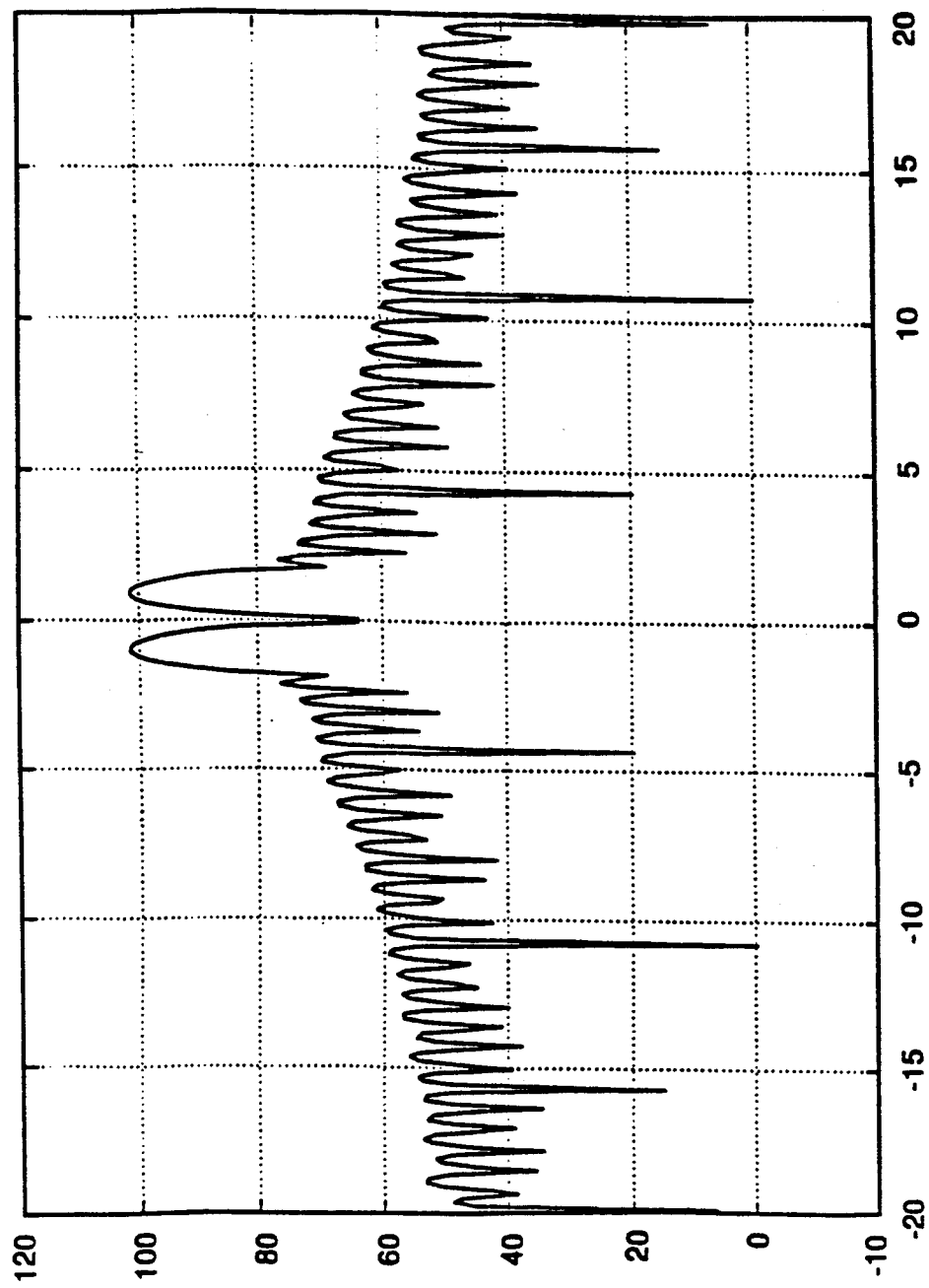
Figure 4E:
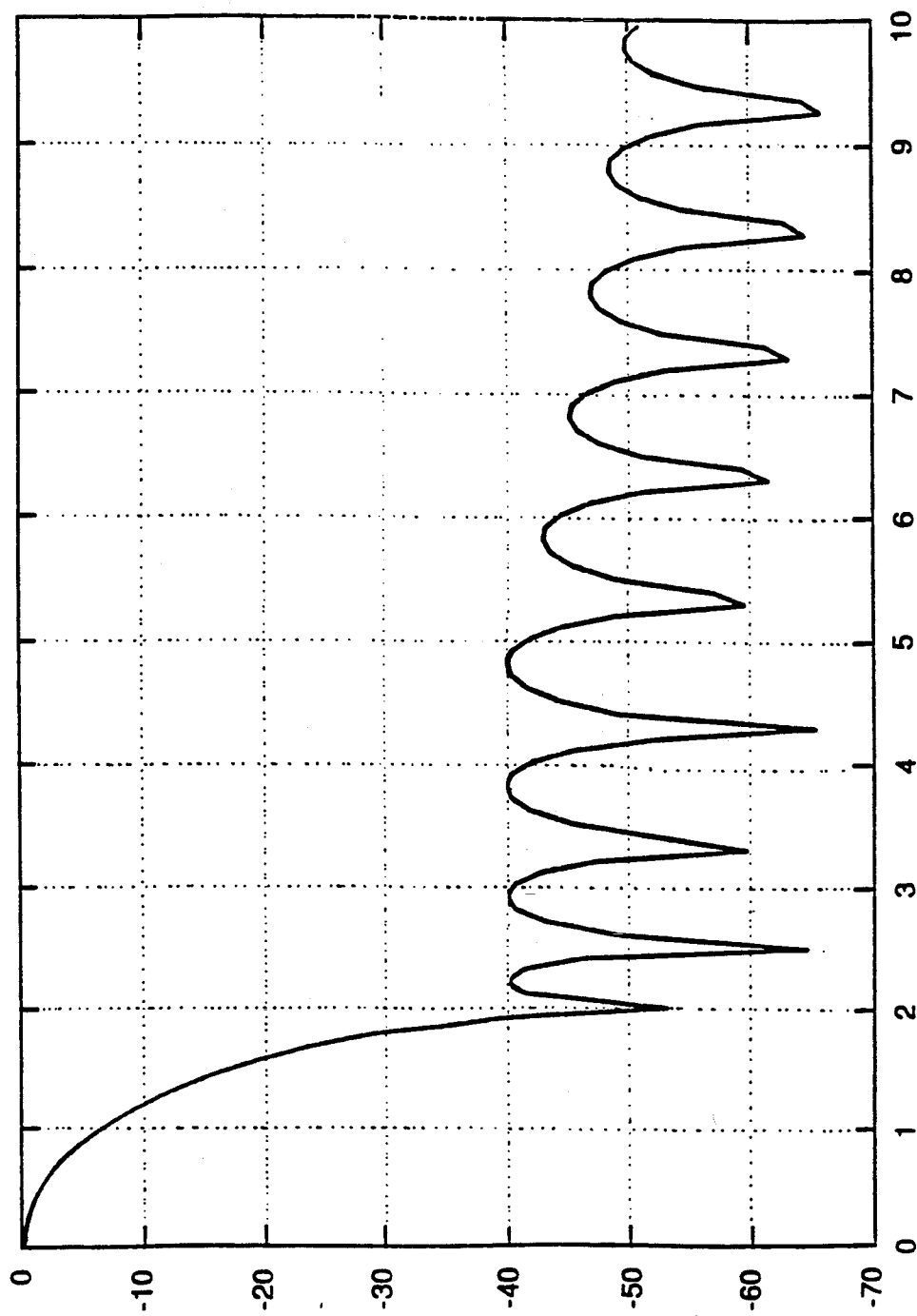
FIGS. 4e, 4f, and 4g, respectively, are cross-sectional views of predetermined electromagnetic field radiation patterns that may be formed by an embodiment of a nonrectangular antenna aperture in accordance with the invention.
Figure 4F:
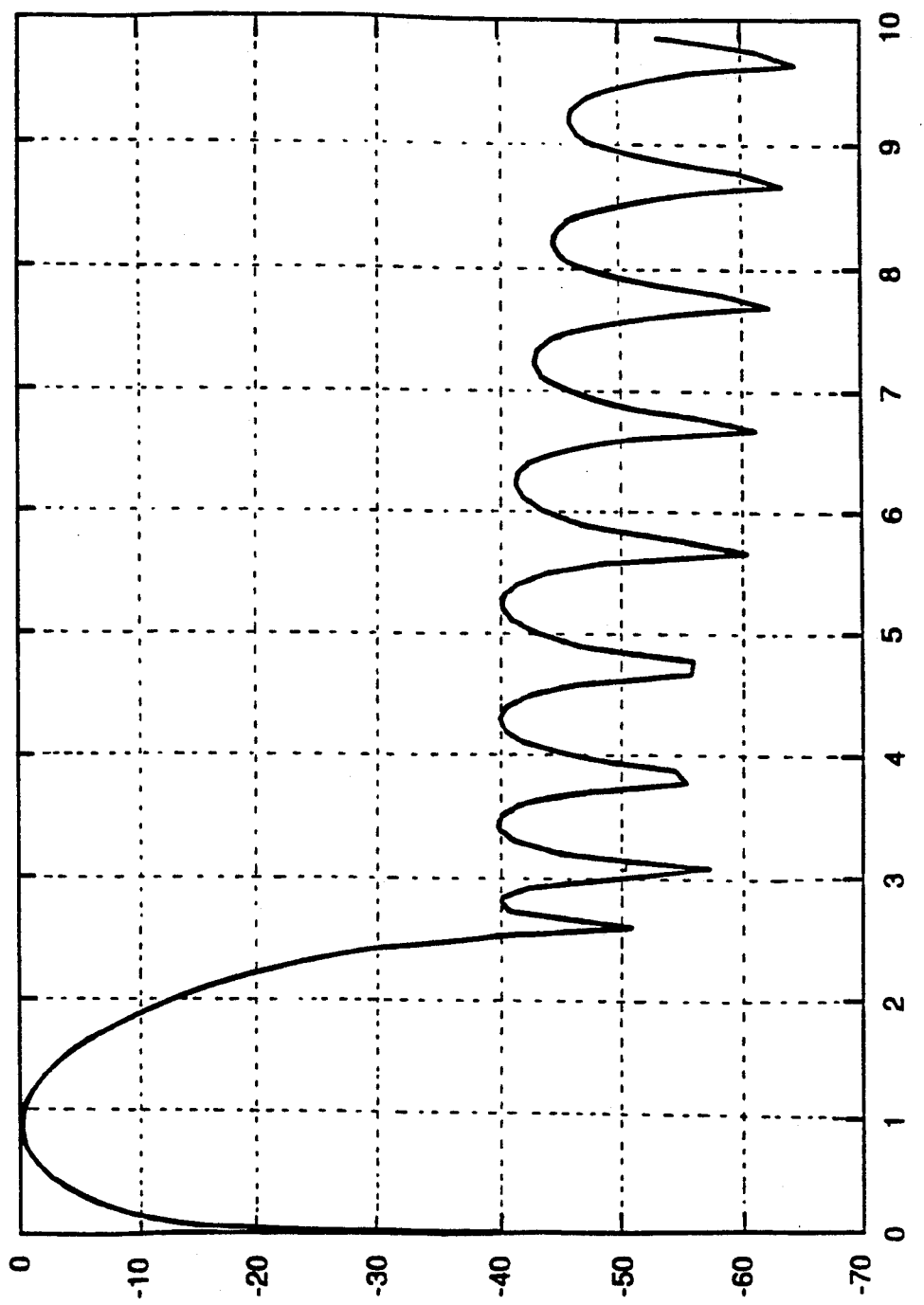
Figure 4G:
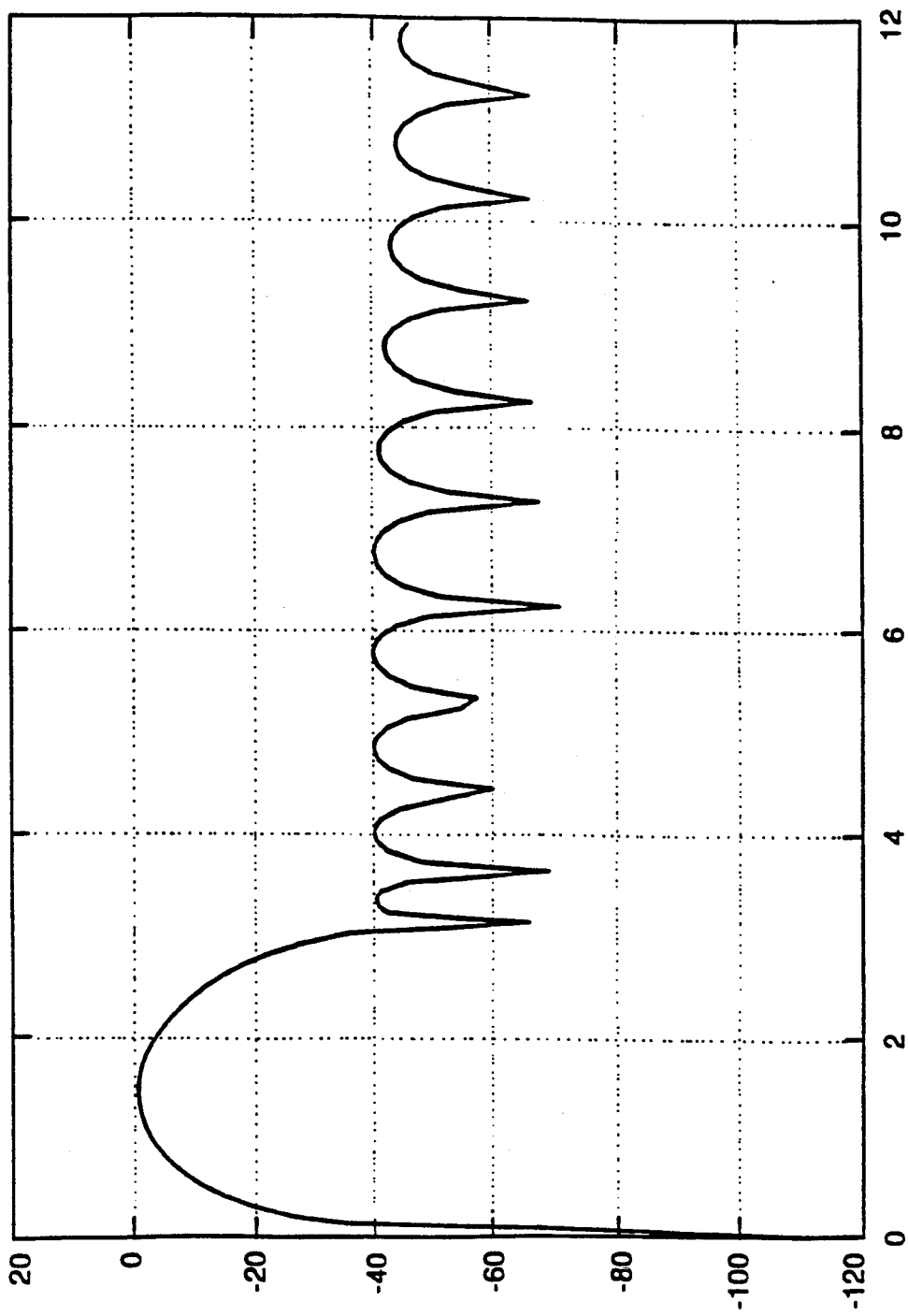

As previously described and as illustrated in FIGS. 3b, 3c, 4b, 4c, 4d, 4f, and 4g, other predetermined electromagnetic field radiation patterns may be formed or scanned depending upon the modulation applied to the signals by the aperture. For example, for the embodiment illustrated in FIG. 1, the electromagnetic field radiation pattern illustrated in FIGS. 3b and 4b, 4c, and 4f may be realized when the aperture phase-modulates the signals received by the elements or to be transmitted by the elements for two successively adjacent quadrants, such as first and second quadrants 110 and 120 or first and fourth quadrants 110 and 140, so that the modulated signals have a phase difference, such as 180°, with respect to the modulated signals for the remaining two successively adjacent quadrants substantially in accordance with a predetermined illumination distribution corresponding to the desired electromagnetic field radiation pattern. Likewise, a different electromagnetic field radiation pattern, such as the electromagnetic field radiation pattern illustrated in FIGS. 3c, 4d, and 4g, may be realized when the aperture modulates the signals for two diagonally adjacent quadrants, such as first and third quadrants 110 and 130, so that the modulated signals have a phase difference, such as 180°, with respect to the modulated signals for the remaining diagonally adjacent quadrants, again substantially in accordance with a predetermined illumination distribution corresponding to the desired electromagnetic field radiation pattern. In the context of this invention, electromagnetic field radiation patterns formed by modulating signals for two successively adjacent quadrants substantially out of phase with respect to the modulated signals for the remaining quadrants are termed "delta-elevation $(\Delta_E)$" or "delta-azimuth $(\Delta_A)$" beams, depending upon the successively adjacent quadrants chosen. Furthermore, due at least in part to the phase modulation described, these electromagnetic field radiation patterns have a null at substantially the same location as the peak of the mainlobe of the sum beam and that null extends substantially immediately above a line corresponding to zero elevation or zero azimuth with respect to the aforementioned directional axis, for the delta-elevation and delta-azimuth beams, respectively, as illustrated in FIGS. 3b, 4b, 4c, and 4f. Likewise, modulating signals for two diagonally adjacent quadrants substantially out of phase with respect to the remaining diagonally adjacent quadrants realizes an electromagnetic field radiation pattern termed the "delta-delta $(\Delta_\Delta)$" beam, which has a null extending along both axes substantially corresponding to zero azimuth and zero elevation in the radiation pattern, as illustrated in FIGS. 3c, 4d, and 4g. As further illustrated in FIG. 3b, the delta beams or electromagnetic field radiation patterns for the embodiment illustrated in FIG. 1 have two substantially identical mainlobes adjacent the null, one on either side, and a predetermined number of substantially equal sidelobes. Likewise, the delta-delta (or "double-delta") beam has four substantially identical mainlobes adjacent the central null and a predetermined number of substantially equal sidelobes. Nonetheless, as described for the sum beam, the invention is not restricted in scope to embodiments forming beams in which the predetermined sidelobe levels are substantially equal.

It will be appreciated that while the illumination distribution to realize a sum beam (or "sigma beam") is symmetrical in azimuth and elevation, the illumination distributions for the delta beams are symmetrical with respect to either azimuth or elevation and antisymmetrical with respect to the alternate or remaining parameter. Likewise, the illumination distribution to realize a double-delta beam is antisymmetrical in both azimuth and elevation. Furthermore, FIGS. 3a to 3c, 4a to 4d, and 4e to 4g illustrate that the electromagnetic field radiation patterns formed by an aperture in accordance with the invention may have different rotational periodicities, since those in FIGS. 3a, 3b and 3c illustrate rotational periodicities of 0, 1, and 2, respectively.

Figure 2A:
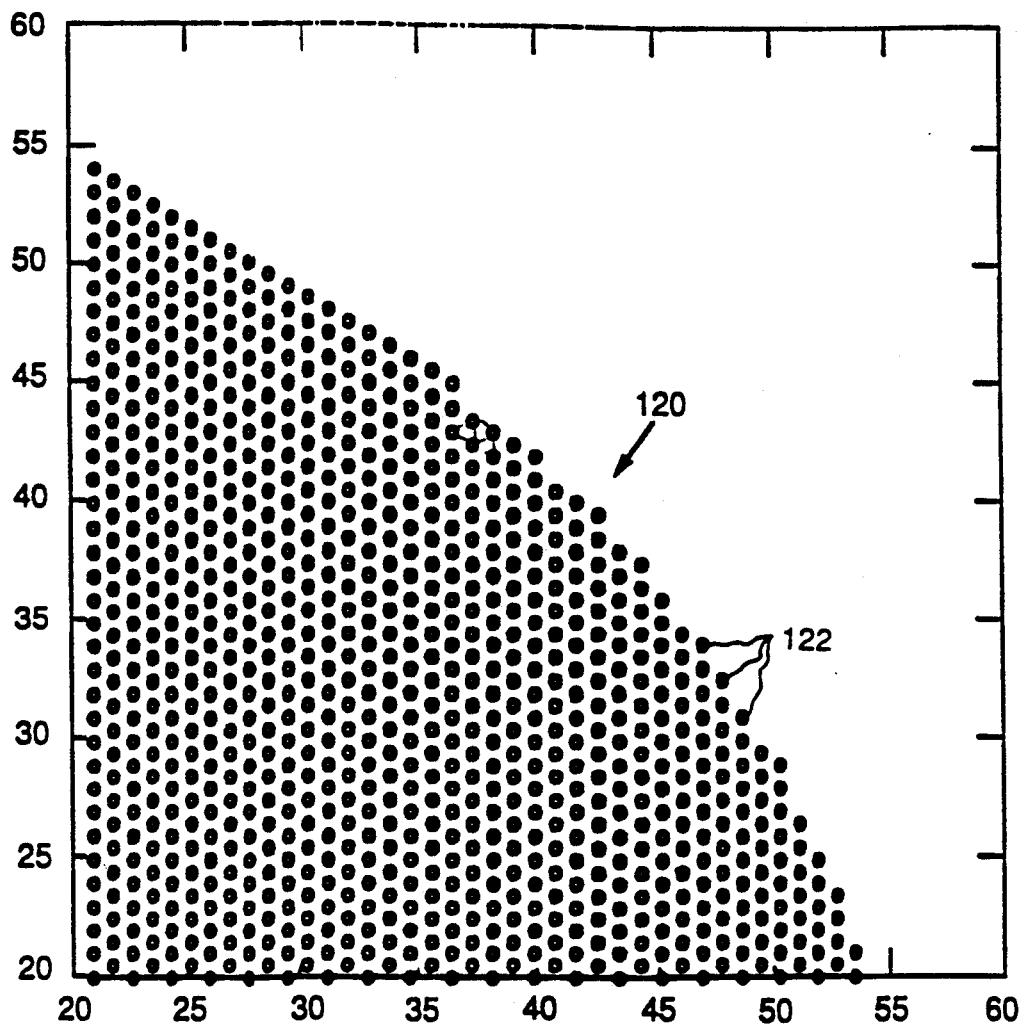
FIG. 2a illustrates a portion of FIG. 1 in greater detail.
Figure 2B:
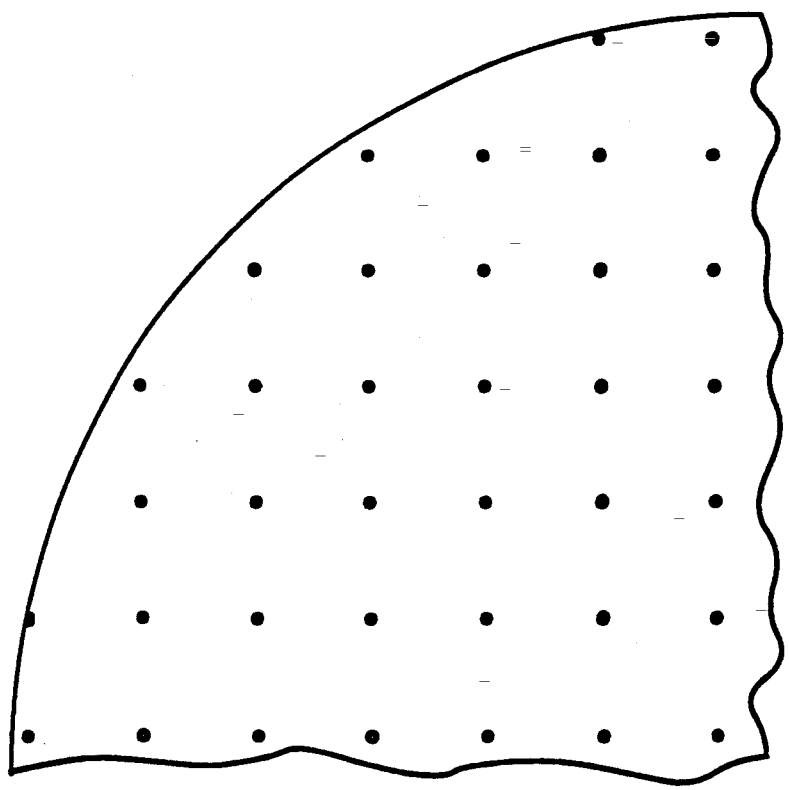
FIG. 2b illustrates a portion of an embodiment of a nonrectangular aperture in accordance with the invention having a rectangular grid configuration of antenna elements.

Although the aperture illustrated in FIG. 1 has 12,175 antenna elements, it will be appreciated that the invention is not restricted in scope to a nonrectangular aperture with this particular number of elements. In fact, satisfactory performance for an aperture in accordance with the invention may be obtained with as few as 100 antenna or dipole elements. Theoretically, a nonrectangular aperture in accordance with the invention may incorporate as many elements as desired; however, cost considerations may impose an upper bound on the desirable number of such elements. For the embodiment illustrated in FIG. 1 and, as shown in FIG. 2 in greater detail, the dipole elements 122 are positioned in a triangular grid configuration over the entire aperture, such as described in *Introduction to Antennas*, by Morton Smith, published by MacMillan Education, Ltd. (1988), and herein incorporated by reference. Typically, and as illustrated in FIG. 2, any three adjacent dipoles are positioned to form an isosceles triangle. For satisfactory performance, the distance between the dipoles or elements should be on the order of $\lambda/2$ to avoid grating lobes, although some variation may be tolerated depending on the specific beam coverage required in azimuth or elevation. As will be appreciated, the invention is not restricted in scope to this particular grid configuration. For example, a rectangular grid configuration may be employed, as described in Chapter 6 of the last referenced text and shown in FIG. 2b.

The selection of the predetermined illumination distribution for aperture 100 to realize the desired predetermined electromagnetic field radiation pattern is based on an extension of a beam or electromagnetic field radiation pattern synthesis procedure described in "Design of Line-Source Antennas for Narrow Beam Width and Low Sidelobes," written by T. T. Taylor, published in *IRE Transactions on Antennas and Propagation*, Vol. AP-3, January, 1955, "Design of Circular Aperture for Narrow Beamwidth and Low Sidelobes," written by T. T. Taylor, published in *IRE Transactions on Antennas and Propagations*, Vol. AP-8, January, 1960, and "Table of Taylor Distribution for Circular Aperture Antennas", written by R. C. Hansen, published in *IRE Transactions on Antennas and Propagation*, Vol. AP-8, June 1960, all of which are herein incorporated by reference. It is well-known in the literature that idealized current or illumination distributions for antenna apertures are often not physically realizable due to "illumination function singularities." Taylor presented a method to shift the zeros or nulls of the current or illumination distribution to avoid the singularities, but as a result of his synthesis technique the sidelobes of the resulting or corresponding electromagnetic field radiation pattern are no longer of equal or predetermined heights. An antenna aperture in accordance with the present invention, however, satisfies the basic criteria for avoiding singular behavior and, thus, is physically realizable, while at the same time providing sidelobes with predetermined or, alternatively, substantially equal sidelobe levels. This results in a more complex electromagnetic field radiation pattern and has the advantage that the locations of the zeros or nulls of the electromagnetic field radiation pattern may be placed in substantially predetermined positions or locations relative to each other. Likewise, narrow beamwidths may be realized with little or no degradation in the mainlobe-to-sidelobe ratio. Furthermore, an aperture in accordance with the present invention permits the synthesis of delta-elevation, delta-azimuth, and delta-delta beams, as desired for monopulse processing.

The problem of synthesis essentially relies on the solution of an integral equation for a prescribed electromagnetic field radiation pattern F, for an illumination or current distribution g, on a surface radiating or receiving electromagnetic energy, such as a nonrectangular antenna aperture. As described in *Electromagnetic Theory*, written by J. A. Stratton, and published by McGraw-Hill Book Company (1941), this integral equation is obtained from the solution of Maxwell's equations using Hertz's potentials. For convenience, the terms that correspond to the elemental factor are omitted because the elemental factor should be characterized by the type of antenna elements used for the array, such as a dipole. Thus, in accordance with the previously described equation and making the usual far-field approximation:

$$F(u,\Phi) = \frac{1}{2\pi} \int_{\phi=\Phi}^{\phi=2\pi+\Phi} d\phi \int_0^\pi g(p,\phi) e^{(jpu\cos(\Phi-\phi))} p\, dp, \quad [1]$$

where u equals $2a[\sin\theta]/\lambda$, typically referred to as "standard bandwidth", a is the aperture radius, $\lambda$ is wavelength, $(\theta,\phi)$ are spherical coordinates, and p is the radial variable of integration. In spherical coordinates the proper definition of parameters will lead to the same analysis for a beam steered at arbitrary angles $\theta_o$ and $\phi_o$ in azimuth and elevation, as previously described. As will be appreciated by one skilled in the art, this definition of parameters defines the electromagnetic field radiation pattern for an embodiment of a nonrectangular aperture, as illustrated in FIG. 1. Nonetheless, as explained in more detail hereinafter, the mainlobe jammer nulling capability is not restricted to a substantially circular embodiment of a nonrectangular antenna aperture in accordance with the invention as illustrated in FIG. 1.

Based on the solution of the scalar wave equation in cylindrical coordinates, that is as a product of Bessel and trigonometric functions, the solution of the current or the illumination function $g(p,\phi)$ is assumed to have the following formula:

$$g(p,\phi) = \sum_{i,m=0}^{\infty} \cos(m\phi) B_i J_m(\mu_i p), \quad [2a]$$

where $J_m$ is the Bessel function, $B_i$ are coefficients providing the desired illumination function, the $\mu_i$ are discrete parameters introduced to permit a separation of variables for solving the scalar wave equation, and m is a non-negative integer providing rotational periodicity. In accordance with the invention, the above series for g for a prescribed m corresponding to the rotational periodicity, is truncated as follows:

$$g_m(p,\phi) = \cos(m\phi) \sum_{i=0}^{i=\bar{n}-1} B_i J_m(\mu_i p), \quad [2b]$$

where $\bar{n}-1$ is the number of sidelobes having substantially predetermined levels or heights. It will be appreciated that rotational periodicity corresponds to a type of circular symmetry arising from the inclusion of a trigonometric function in which $\phi$ varies from $0°$ to $360°$ or from 0 to $2\pi$ radians. After using the integral representation of the Bessel function and the following identities:

$$\frac{d}{dx}(x^n J_n(x)) = x^n J_{n-1}(x),$$

$$\frac{d}{dx}(x^{-n} J_n(x)) = -x^{-n} J_{n+1}(x),$$

and after some manipulation, the integral specified above specified above reduces to:

$$F_m(u,\phi) = j^m\cos(m\phi) \sum_{i=0}^{\bar{n}-1} B_i \frac{\pi}{(\mu_i^2 - \mu^2)} [uJ_m(\mu_i\pi)J'_m(u\pi) - \mu_iJ_m(u\pi)J'_m(\mu_i\pi)],$$ [3]

where one skilled in the art would appreciate that the cosine function may be replaced by the sine function in aforesaid equation [3].

Equation [3] is completely specified except for the coefficients $B_i$. Thus, for a given set of $\mu_i$ by starting with zeros of the electromagnetic field radiation pattern F and iterating until the prescribed sidelobe levels have been achieved to a given degree of accuracy, the coefficients $B_i$ may be determined from the zeros of the electromagnetic field radiation pattern and replaced in expression [2b] provided above for the current or illumination distribution g to provide the desired illumination distribution.

One aspect of determining the coefficients $B_i$ and thus the distribution g involves the placement of $\mu_i$ for the electromagnetic field radiation pattern F. For the desired electromagnetic field radiation pattern to be physically realizable $\mu_i$ should be selected or placed to avoid singularities in the function g. This may be accomplished by a technique for determining the asymptotic zeros for F. Avoiding any singular behavior of the illumination distribution may be achieved by having asymptotic zeros of the electromagnetic field pattern F located at $\mu_i$ given by the roots of $$J'_m(\mu_i\pi)=0$$ [3a].

As explained hereinafter, these asymptotic zeros will lead to a physically realizable current or illumination distribution with no singularities for a predetermined electromagnetic field radiation pattern, as desired. Likewise, this will ensure desirable asymptotic decay behavior of the sidelobes of the electromagnetic field radiation pattern F decay.

Equation [3a] for the zeros $\mu_i$ in terms of the derivative of the Bessel function may be derived from the following integral representation.

$$F_m(u) = \int_{p=o}^{p=\pi} (\pi^2 - p^2)^A g(p)J_m(pu)p^{m+1}dp.$$ [4]

The asymptotic behavior of this integral may be evaluated due to its behavior for large values of u. Letting $\bar{g}$ equal 1 and evaluating the integral near p equals $\pi$ suggests that avoiding the condition A less than zero avoids the singularities. Letting $p=\pi x$ in equation [4] results in the equation:

$$F(u)=D_1J_{m+A+1}(\pi u)$$ [5], where $D_1$ equals $$\frac{\pi^{2A+m+2}(2)^A\Gamma(1+A)}{(\pi u)^A}.$$ [5a]

It may now be observed that asymptotically the zeros of equation [5] are the same as those of $J'_{m+A}(\pi\mu)$. Thus, using the function theoretic principle, such as illustrated by a conventional power series expansions, that if two functions have similar asymptotic behavior and similar zeros the functions will be essentially identical asymptotically provides the conclusion that singular behavior of the desired illumination distribution will be avoided if the asymptotic zeros of the electromagnetic field radiation pattern occur at $\mu_i$ provided by equation [3a] giving the derivative of the Bessel function vanishing at $\mu_i$.

Substituting equation [3a] into equation [3] for the electromagnetic field radiation pattern F results in the following equation.

$$F_m(u,\phi) = j^m\cos(m\phi) \sum_{i=0}^{\bar{n}-1} B_i \frac{\pi}{(\mu_i^2 - \mu^2)} [uJ_m(\mu_i\pi)J'_m(u\pi)]$$ [6]

Thus, equation [6] provides the capability to determine the desired coefficients $B_i$. Tables 1–6 are provided hereinafter for particular embodiments of a nonrectangular antenna aperture. It will be appreciated that these tables merely provide examples of embodiments of an antenna aperture and the scope of the invention is not limited to the embodiments provided by these tables.

TABLE 1a

| N-bar | Ratio Db | B0 | Sum | | | |
| --- | --- | --- | --- | --- | --- | --- |
| | | | B1/B0 = 1 | 2 | 3 | 4 |
| 5 | 30 | 0.2026 | −0.8510 | −0.0893 | 0.2541 | −0.2855 |
| 5 | 35 | 0.2026 | −1.2142 | 0.0471 | 0.0821 | −0.1181 |
| 5 | 40 | 0.2026 | −1.5181 | 0.0838 | 0.0038 | −0.0380 |
| 5 | 45 | 0.2026 | −1.7737 | 0.0622 | −0.0264 | −0.0031 |

TABLE 1b

| | Location of Zeros in terms of standard BW | | | | | |
| --- | --- | --- | --- | --- | --- | --- |
| db | z0 | z1 | z2 | z3 | z4 | z5 |
| 30 | 1.5239 | 2.1665 | 3.0749 | 4.0930 | 5.2428 | 6.2439 |
| 35 | 1.6988 | 2.2903 | 3.1476 | 4.1389 | 5.2428 | 6.2439 |
| 40 | 1.8649 | 2.4238 | 3.2357 | 4.1831 | 5.2428 | 6.2439 |
| 45 | 2.0442 | 2.5466 | 3.3192 | 4.2312 | 5.2428 | 6.2439 |

Tables 1a and 1b for the Sum beam for a substantially circular aperture (n̄ = 5)
(Note standard BW = 2asin θ/λ)

TABLE 2a

| | Ratio | | Sum | | | | | |
| --- | --- | --- | --- | --- | --- | --- | --- | --- |
| N-bar | Db | B0 | B1/B0 = 1 | 2 | 3 | 4 | 5 | 6 |
| 7 | 30 | 0.2026 | −0.7643 | −0.1442 | 0.3506 | −0.4722 | 0.5266 | −0.4602 |
| 7 | 35 | 0.2026 | −1.1385 | 0.0142 | 0.1365 | −0.2154 | 0.2530 | −0.2261 |
| 7 | 40 | 0.2026 | −1.4582 | 0.0720 | 0.0301 | −0.0844 | 0.1126 | −0.1056 |

TABLE 2a-continued

| N-bar | Ratio Db | B0 | B1/B0 = 1 | 2 | 3 | 4 | 5 | 6 |
|---|---|---|---|---|---|---|---|---|
| | | | Sum | | | | | |
| 7 | 45 | 0.2026 | −1.7331 | 0.0624 | −0.0167 | −0.0224 | 0.0434 | −0.0454 |

TABLE 2b

| db | z0 | z1 | z2 | z3 | z4 | z5 | z6 |
|---|---|---|---|---|---|---|---|
| | | | Zeros | | | | |
| 30 | 1.4774 | 2.1380 | 3.0130 | 3.9928 | 5.0141 | 6.0787 | 7.2448 |
| 35 | 1.6413 | 2.2782 | 3.1023 | 4.0546 | 5.0546 | 6.1044 | 7.2448 |
| 40 | 1.8437 | 2.3909 | 3.1895 | 4.1098 | 5.1028 | 6.1294 | 7.2448 |
| 45 | 2.0237 | 2.5261 | 3.2876 | 4.1790 | 5.1525 | 6.1589 | 7.2448 |

Tables 2a and 2b for the sum beam for a substantially circular aperture ($\bar{n} = 7$)

TABLE 3a

| N-bar. | Ratio Db | B0 | B1/B0-1 | 2 | 3 | 4 |
|---|---|---|---|---|---|---|
| | | | Delta | | | |
| 5 | 30 | 0.7608 | 0.7563 | −0.0446 | −0.0266 | 0.0479 |
| 5 | 35 | 0.7420 | 0.9652 | −0.0575 | 0.0102 | 0.0109 |
| 5 | 40 | 0.7266 | 1.1466 | −0.0354 | 0.0228 | −0.0044 |
| 5 | 45 | 0.7143 | 1.3062 | 0.0098 | 0.0223 | −0.0091 |

TABLE 3b

| db | z0 | z1 | z2 | z3 | z4 | z5 |
|---|---|---|---|---|---|---|
| | | Location of Delta Zeros in standard BW | | | | |
| 30 | 2.2093 | 2.8098 | 3.6733 | 4.6530 | 5.7345 | 6.7368 |
| 35 | 2.3824 | 2.9484 | 3.7610 | 4.7022 | 5.7345 | 6.7368 |
| 40 | 2.5673 | 3.0753 | 3.8497 | 4.7514 | 5.7345 | 6.7368 |
| 45 | 2.7408 | 3.2148 | 3.9405 | 4.7991 | 5.7345 | 6.7368 |

Tables 3a and 3b for the Delta beam for a substantially circular aperture ($\bar{n} = 5$)

TABLE 4a

| N-bar | Ratio Db | B0 | B1/B0 = 1 | 2 | 3 | 4 | 5 | 6 |
|---|---|---|---|---|---|---|---|---|
| | | | Delta | | | | | |
| 7 | 30 | 0.7646 | 0.7074 | −0.0281 | −0.0537 | 0.0944 | −0.1127 | 0.1010 |
| 7 | 35 | 0.7458 | 0.9275 | −0.0532 | −0.0012 | 0.0313 | −0.0467 | 0.0453 |
| 7 | 40 | 0.7286 | 1.1248 | −0.0367 | 0.0196 | 0.0026 | −0.0147 | 0.0178 |
| 7 | 45 | 0.7146 | 1.3027 | 0.0087 | 0.0218 | −0.0083 | −0.0004 | 0.0048 |

TABLE 4b

| db | z0 | z1 | z2 | z3 | z4 | z5 | z6 |
|---|---|---|---|---|---|---|---|
| | | | Zeros | | | | |
| 30 | 2.1794 | 2.7777 | 3.6228 | 4.5782 | 5.5759 | 6.6136 | 7.7385 |
| 35 | 2.3472 | 2.9347 | 3.7298 | 4.6488 | 5.6255 | 6.6444 | 7.7388 |
| 40 | 2.5376 | 3.0738 | 3.8325 | 4.7215 | 5.6792 | 6.6757 | 7.7388 |
| 45 | 2.7005 | 3.2404 | 3.9481 | 4.8031 | 5.7343 | 6.7095 | 7.7385 |

Tables 4a and 4b for the Delta beam for a substantially circular aperture ($\bar{n} = 7$)

TABLE 5a

| N-bar. | Ratio Db | B0 | B1/B0 = 1 | 2 | 3 | 4 |
|---|---|---|---|---|---|---|
| | | | Delta-delta | | | |
| 7 | 30 | 1.258 | 0.7273 | −0.0512 | −0.0013 | 0.0203 |
| 7 | 35 | 1.2244 | 0.9143 | −0.0483 | 0.0188 | −0.0004 |
| 7 | 40 | 1.2000 | 1.0817 | −0.0166 | 0.0224 | −0.0082 |
| 7 | 45 | 1.1837 | 1.2319 | 0.0350 | 0.0182 | −0.0095 |

TABLE 5b

| db | z0 | z1 | z2 | z3 | z4 | z5 |
|---|---|---|---|---|---|---|
| | | Location of Delta-delta Zeros in standard BW | | | | |
| 30 | 2.7234 | 3.3301 | 4.1888 | 5.1543 | 6.2112 | 7.2166 |
| 35 | 2.9155 | 3.4679 | 4.2782 | 5.2051 | 6.2112 | 7.2166 |
| 40 | 3.1031 | 3.6084 | 4.3713 | 5.2582 | 6.2112 | 7.2166 |
| 45 | 3.2859 | 3.7499 | 4.4668 | 5.3127 | 6.2112 | 7.2166 |

Tables 5a and 5b for the Double-delta beam for a substantially circular aperture ($\bar{n} = 5$)

TABLE 6a

| N-bar | Ratio Db | B0 | B1/B0 = 1 | 2 | 3 | 4 | 5 | 6 |
|---|---|---|---|---|---|---|---|---|
| | | | Delta-delta | | | | | |
| 7 | 30 | 1.2679 | 0.6892 | −0.0422 | −0.0166 | 0.0461 | −0.0592 | 0.0539 |
| 7 | 35 | 1.2305 | 0.8899 | −0.0471 | 0.0132 | 0.0092 | −0.0209 | 0.02200 |
| 7 | 40 | 1.2020 | 1.0739 | −0.0176 | 0.0216 | −0.0065 | −0.0029 | 0.0068 |
| 7 | 45 | 1.1813 | 1.2429 | 0.0381 | 0.0187 | −0.0110 | 0.0042 | 0.000 |

TABLE 6b

| db | z0 | z1 | z2 | z3 | z4 | z5 | z6 |
|---|---|---|---|---|---|---|---|
| | | | Zeros | | | | |
| 30 | 2.6991 | 3.3000 | 4.1466 | 5.0917 | 6.0854 | 7.1151 | 8.2207 | 9.2239 |
| 35 | 2.8996 | 3.4485 | 4.2518 | 5.1667 | 6.1374 | 7.1466 | 8.2207 | 9.2239 |
| 40 | 3.0984 | 3.6022 | 4.3631 | 5.2468 | 6.1933 | 7.1803 | 8.2207 | 9.2239 |

TABLE 6b-continued

| | Zeros | | | | | | |
|---|---|---|---|---|---|---|---|
| db | z0 | z1 | z2 | z3 | z4 | z5 | z6 |
| 45 | 3.2947 | 3.7593 | 4.4794 | 5.3315 | 6.2524 | 7.2158 | 8.2207 | 9.2239 |

Tables 6a and 6b for the Double-delta beam for a substantially circular aperture ($\bar{n} = 7$)

A number of techniques are available to solve for the coefficients $B_i$ specified above to compile other tables than those provided above. In accordance with one such technique new parameters are defined as follows:

$$u_i = \sigma\sqrt{Z^2 + (i - 1/2)^2} \quad i = 1,2,\ldots\bar{n}, \quad [6a]$$

$$\sigma = \frac{\mu_{\bar{n}}}{\sqrt{Z^2 + (\bar{n} - 1/2)^2}} \text{ and } Z = \frac{\cosh^{-1}(A/B)}{\pi}. \quad [6b]$$

The above values for $\mu_i$ may be employed in equation [6] to provide $B_1, B_2 \ldots B_{\bar{n}-1}$ in terms of $B_o$ at the zeros of $F_m$. Next, the values of locations of the sidelobes are provided by equation [6a] and a set of equations may be solved providing the prescribed values of the sidelobes. Iterating in accordance with this technique until a convergence criterion has been met provides the desired coefficients. It will now be appreciated that it is not essential to have the parameters specified in equations [6a] and [6b]. Other parameters in the vicinity of these particular parameters will provide satisfactory performance in conjunction with an iterative approach. It will also be appreciated by one skilled in the art that this numerical procedure may be extended to solve for sidelobe levels of any predetermined values although the tables previously provided illustrate numerical results for substantially equal sidelobe levels. Furthermore, while sidelobes may be realized at any predetermined levels, it will be appreciated that a trade-off exists in that the beamwidth of the mainlobe (or mainlobes) increases as the sidelobe levels are reduced. It will likewise be appreciated that more iterations may be performed for higher precision, although only a few iterations provide results within a few percent of the asymptotically ideal solution.

Yet another technique for determining the coefficients $B_i$ is now provided. If in equation [1] for the electromagnetic field radiation pattern F, m equals zero then the equation becomes $$F(u) = \int_o^\pi pg(p)J_o(pu)dp. \quad [7]$$

Using the method of Dossier, the illumination distribution g is then provided by $$g(p) = \sum_{m=o}^{\bar{n}-1} D_m J_o(\mu_m p), \quad [8]$$

with $J_1(\pi\mu_m)=0$. Substituting F becomes $$F(u) = a_o(u) + \sum_{m=1}^{\bar{n}-1} F(\mu_m)a_m(u), \quad [9]$$

where $$a_o(u) = \frac{2J_1(\pi u)}{\pi u}, \quad [10a]$$

$$a_m(u) = \frac{2\mu J_1(\pi u)}{\pi(u^2 - \mu_m^2)J_o(\pi\mu_m)}. \quad [10b]$$

Now the desired coefficients $B_i$ may be determined by solving for $F(\mu_m)$ after locating the central zeros of the electromagnetic field radiation pattern and iterating substantially in the same manner as previously described. Like the previous technique, this method may be modified to accommodate sidelobes of substantially equal prescribed magnitudes. Once the coefficients $B_i$ and zeros $\mu_i$ are determined to provide the desired illumination distribution corresponding to the predetermined electromagnetic field radiation pattern, the phase and amplitude modulators to be applied by the antenna elements to realize the desired illumination distribution may be determined by discretely sampling the illumination distribution by any one of a number of well-known sampling techniques, such as described in chapter 6 of *Antenna Theory and Design*, written by Robert S. Elliot, published by Prentice-Hall, Inc. (1988), and herein incorporated by reference.

A nonrectangular antenna aperture may form a predetermined electromagnetic field radiation pattern in accordance with the following method. Electromagnetic signals may be received over the surface of the aperture, the received signals having a component substantially in the direction of an axis oriented at a predetermined azimuth angle and a predetermined elevation angle with respect to the plane of the aperture, as previously described. The component of the received signals may then be phase and amplitude modulated substantially in accordance with a predetermined illumination distribution, as previously described, to form a predetermined radiation pattern, as previously described. The pattern formed is defined as a function of angle in azimuth and elevation relative to the axis. Likewise, the aperture may produce and radiate electromagnetic signals having an amplitude and phase over the surface of the aperture substantially in accordance with a predetermined illumination distribution to form a predetermined electromagnetic field radiation pattern.

Figure 5:
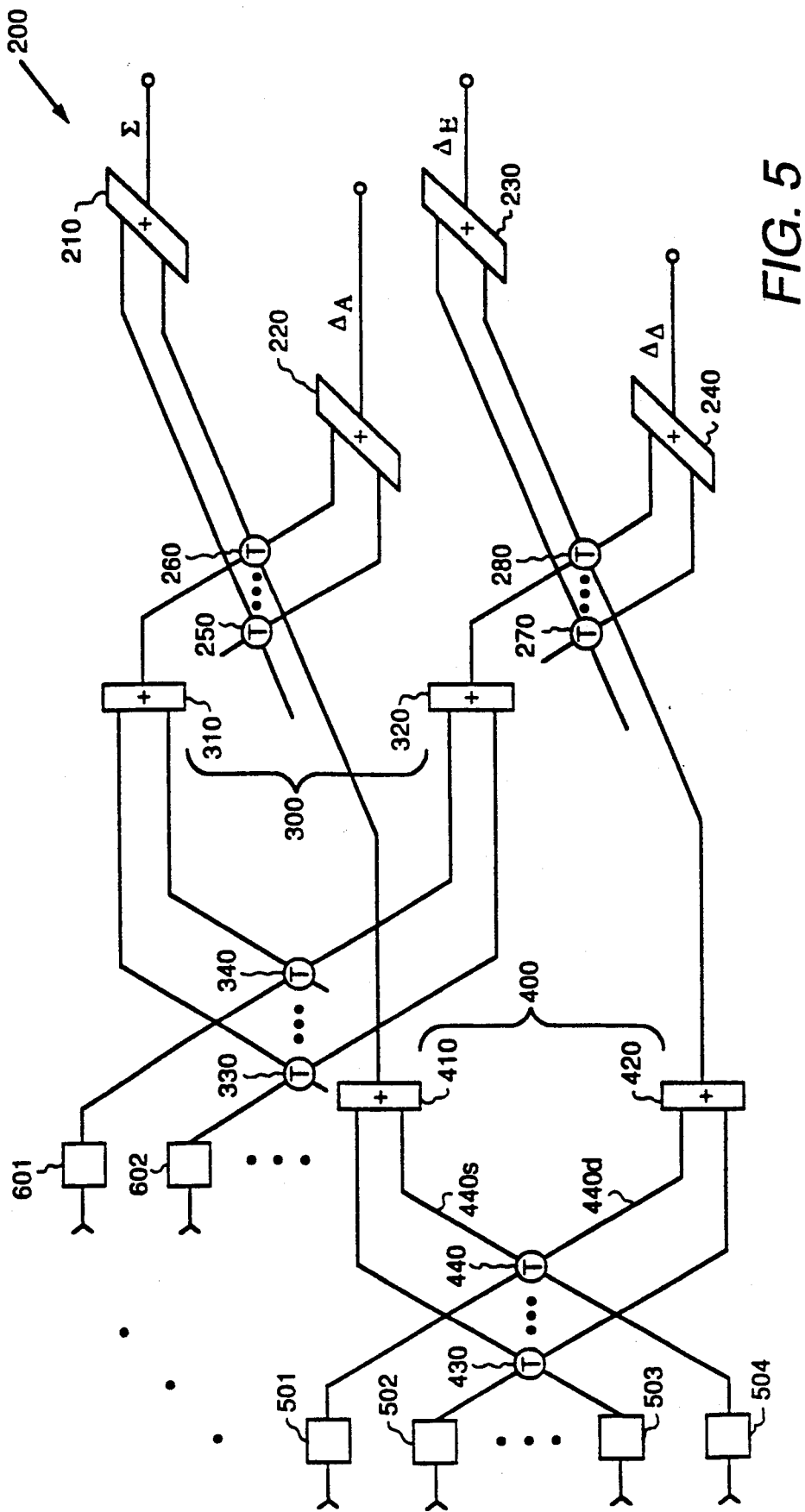
FIG. 5 is a schematic illustration of an embodiment of a radar antenna beamformer.

FIG. 5 illustrates an antenna beamformer 200. Typically, an antenna beamformer is employed, such as in a phased array radar system, to simultaneously form a plurality of radiation patterns to accomplish monopulse processing. Thus, beamformer 200 may be employed to accomplish phase and amplitude modulation of electromagnetic signals either after reception or before transmission. As will become clear, certain advantages regarding signal processing or modulation may be obtained from the use of such an antenna beamformer. As explained with respect to the aperture, beamformer 200 may be employed for use in either the transmission or reception of electromagnetic signals. Thus, the phase and amplitude modulation introduced by antenna beamformer 200 for signals radiated by the aperture will result in the desired predetermined electromagnetic field radiation pattern. Likewise, the antenna beamformer introduces phase and amplitude modulation into received electromagnetic signals so that signals originating substantially within a region defined by the predetermined electromagnetic field radiation pattern are identified.

As illustrated, antenna beamformer 200 comprises four horizontal beamformers 210, 220, 230, and 240, respectively, and a plurality of vertical beamformer pairs, such as 300 and 400, respectively. Each pair has a first vertical beamformer, such as 310 or 410, and a second vertical beamformer, such as 320 or 420. Each vertical beamformer pair is coupled to a separate plurality of discrete elements, such as dipoles, so that each beamformer in the antenna beamformer has the capability to form the superposition of weighted and phased electromagnetic signals either produced for transmission or received by the aperture. Furthermore, the first and second horizontal beamformers, 210 and 220, are coupled to the first vertical beamformer in each of said vertical beamformer pairs, and the third and fourth horizontal beamformers, 230 and 240, are coupled to the second vertical beamformer in each of the vertical beamformer pairs so that each horizontal beamformer has the capability to form a different predetermined electromagnetic field radiation pattern, such as those previously described. Typically, for effective operation the radar antenna beamformer illustrated in FIG. 5 will be used in conjunction with a substantially circular antenna aperture, such as the embodiment illustrated in FIG. 1. In such an embodiment, the antenna aperture may comprise radiating or receiving elements, such as dipoles, each element having a predetermined position in the aperture and being adapted for modulating an electromagnetic signal before transmission or after reception in accordance with a predetermined illumination distribution, such as with an antenna beamformer.

As previously described, a radar antenna beamformer, such as the one illustrated in FIG. 5, may have the capability to simultaneously form predetermined electromagnetic field patterns. This is accomplished as described hereinafter. Each antenna element in the antenna aperture, such as dipoles, propagates or receives electromagnetic signals. As illustrated in FIG. 5, pairs of vertical beamformers, such as the pair 410 and 420, or the pair 310 and 320, are coupled to a different plurality of dipole elements vertically aligned in the aperture. As illustrated, each vertical beamformer pair coupled to the dipole elements is coupled to a plurality of hybrids, such as magic-T junctions, as illustrated in FIG. 5 or as described in chapter 4 of *Monopulse Principles and Techniques*. As illustrated, the vertical beamformer pairs are coupled to a column of vertically aligned dipole elements so that each beamformer in the pair is coupled to all of the dipole elements in a particular column; however, the first vertical beamformer, such as 310 or 410, is coupled to a plurality of magic-T junctions, such as 330 and 340 or 430 and 440, respectively, so that the received signals phase are modulated and superpositioned to be substantially in phase. In contrast, the second vertical beamformer, such as 420 or 320, is coupled to the magic-T junctions for phase modulating and superpositioning the electromagnetic signals so that selected modulated signals are superpositioned to be substantially in phase and the remaining modulated signals are superpositioned to have a different phase with respect to the selected signals while being substantially in phase with respect to each other. Likewise, the signals may be amplitude modulated. Typically, amplitude modulation is performed by the signal combiners; however, hybrids or junctions may likewise perform such amplitude modulation. For example, in FIG. 5 dipole elements 503 and 504 may receive signals that are to be superpositioned and modulated by magic-T junctions 430 and 440 in conjunction with vertical beamformer 420 to be substantially out of phase with respect to the signals obtained by modulating and superpositioning the signals received by dipole elements 501 and 502. Alternatively, the vertical beamformers may provide modulated signals to the antenna elements for transmission or propagation. Thus, as illustrated, each vertical beamformer, such as 420, comprises a signal combiner, the combiner being coupled to a plurality of magic-T junctions, such as 430 and 440. The signals are superpositioned and phase modulated to be either substantially in phase or substantially out of phase, as described above, such as, for example, in the embodiment illustrated in FIG. 5 in which each magic-T junction includes a sum output, such as 440$s$, and a difference output, such as 440$d$, as described in *Monopulse Principles and Techniques*.

As previously mentioned, first and second horizontal beamformers are coupled to the first vertical beamformer in each of the vertical beamformer pairs. Likewise, each magic-T junction is coupled to a separate two vertical beamformers. Thus, the first horizontal beamformer 210 is coupled to each first vertical beamformer so that the electromagnetic signals are superpositioned and modulated to be substantially in phase thereby producing a sum beam. Likewise, a second horizontal beamformer 220 is coupled to each first vertical beamformer so that the received electromagnetic signals modulated by selected first vertical beamformers are superpositioned by a hybrid or magic-T junction to be substantially out of phase with respect to the signals modulated by the remaining first vertical beamformers thereby producing a predetermined electromagnetic field radiation pattern, such as a delta-azimuth beam.

Similarly, third and fourth horizontal beamformers 230 and 240 are coupled to each of the second vertical beamformers in the manner previously described and illustrated in FIG. 5 with respect to the first and second horizontal beamformers so that horizontal beamformer 230 produces a delta-elevation beam and horizontal beamformer 240 produces a delta-delta or double difference beam.

Thus, a radar antenna beamformer 200 in provides electromagnetic field radiation patterns satisfying the following illumination distribution representations:

$$g_\Sigma(x,y) = g_{\Sigma e}(x,y)\, g_{\Sigma a}(x,y)$$

$$g_{\Delta A}(x,y) = g_{\Sigma e}(x,y)\, g_{\Delta a}(x,y)$$

$$g_{\Delta E}(x,y) = g_{\Delta e}(x,y)\, g_{\Sigma a}(x,y)$$

$$g_{\Delta \Delta}(x,y) = g_{\Delta e}(x,y)\, g_{\Delta a}(x,y) \quad [11].$$

Generally, on the righthand side of equations [11] above the left or first term in each equation, such as $g_{\Sigma e}(x,y)$ or $g_{\Delta e}(x,y)$, corresponds to the illumination distribution modulation provided by the vertical beamformers. Likewise, the first and second ones of equations [11] specified above provide or represent the net amplitude and phase illumination distribution modulations applied by the first and second horizontal beamformers 210 and 220, illustrated in FIG. 5, to signals received by the aperture. Thus, the second or right righthand side term in each of equations [11], such as $g_{\Sigma a}(x,y)$ or $g_{\Delta a}(x,y)$, specifies the additional illumination distribution modulation provided by the antenna beamformer after modulation by the vertical beamformers. The antenna beamformer may be constructed or configured so that $g_{\Sigma e}(x,y)$ corresponds to the amplitude and phase illumination distribution modulation to realize a predetermined mainlobe-to-sidelobe ratio and a predetermined number of sidelobe levels, as previously described for the embodiment illustrated in FIG. 1. By letting this illumination distribution representation correspond to the sum beam and, likewise, letting the righthand side of the second one of equations [11] correspond to the distribution for the previously described delta-azimuth beam, in accordance with the embodiment illustrated in FIG. 5, $g_{\Delta e}(x,y)$ may likewise correspond to the phase and amplitude illumination distribution modulations provided for the delta-elevation beam.

The relationship described above for the righthand side terms of the four previous equations [11] provides the capability to determine the appropriate phase and amplitude illumination distribution modulations provided by the vertical and horizontal beamformers. For example, based on the discussion regarding the embodiment illustrated in FIG. 1, electromagnetic field radiation patterns desired may all be represented by the following equation:

$$F_m(u,\phi) = j^m \cos(m\phi) \sum_{i=0}^{\bar{n}-1} B_i \frac{\pi}{(\mu_i^2 - \mu^2)} [u J_m(\mu_i \pi) J'_m(u\pi)], \quad [12]$$

where, as will be appreciated by one skilled in the art, cosine may be replaced by sine, as previously discussed. Likewise, the previous discussion illustrates that following the generation of coefficients $B_i$, the illumination distribution corresponding to the electromagnetic field radiation pattern is substantially in accordance with $$g(p,\phi) = \cos(m\phi) \sum_{i=0}^{\bar{n}-1} B_i J_m(\mu_i p), \quad [13]$$

which provides beams for m=0, m=1, and m=2, where p is between o and $\pi$ inclusive.

The equations previously provided for the beamformer of FIG. 5 in combination with the functional form of the illumination distribution for an aperture, such as the circular aperture embodiment of FIG. 1, provides the desired relationship between the vertical and horizontal beamformers to provide the desired predetermined electromagnetic field radiation patterns. Thus, imposing the constraint of the first equation upon the second equation and substituting the functional form for the desired predetermined illumination distribution provides the following relationship $$\sum_{i_0=o}^{\bar{n}-1} B_{i_0} J_0(\mu_{i_0} p) = \sum_{i_1=o}^{n-1} \frac{B_{i_1} J_1(\mu_{i_1} p)}{p}, \quad [14]$$

where $g_{\Delta a}(x)$ is chosen to equal x, i.e., $g_{\Delta a}(x)=x$, in the second equation of [11].

Figure 6:
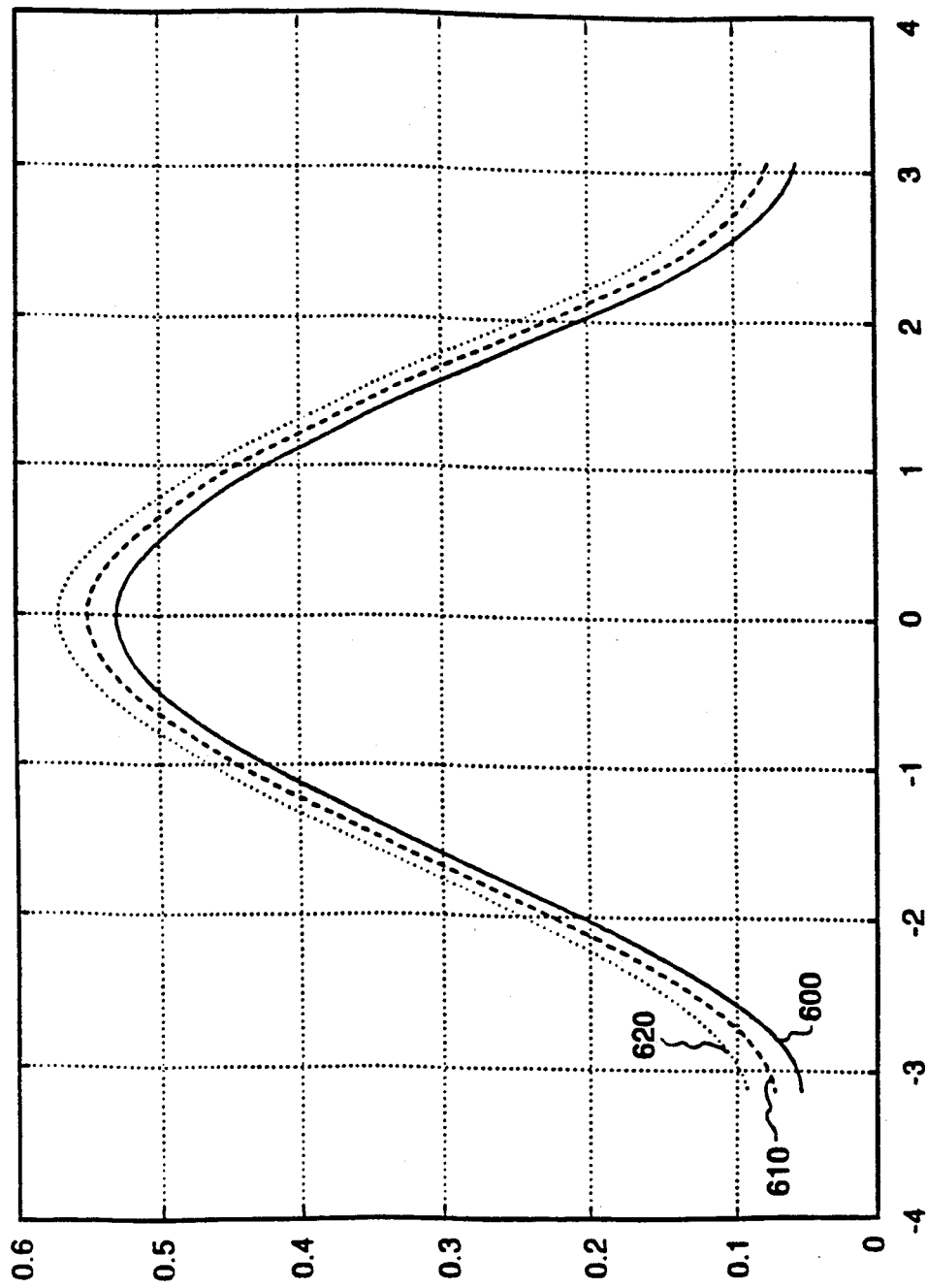
FIG. 6 is a graphical comparison of three predetermined illumination distributions that may be realized by an embodiment of a radar antenna beamformer, such as shown in FIG. 5.

This relationship may be accomplished by performing a least squares minimization and, for illustration purposes only, resulting curves for the embodiment illustrated in FIG. 5 are provided in FIG. 6. In FIG. 6, the curves have been displaced by a slight amount vertically for clarity of display with 600 and 620 corresponding to the illumination distributions for the sum and delta beams, respectively. It will be appreciated that the curves illustrated may be normalized since currents may vary by a multiplicative factor. Thus, the vertical axis provides relative information about the curves, whereas the relevant range on the horizontal axis extends from $-\pi$ to $+\pi$. Furthermore, this identity, i.e., equation [14], is not directly required in beamforming provided the proper weights to achieve amplitude and phase illumination distribution modulation are selected as indicated above by the previously specified equation $g_{\Delta a}(x)=x$. Rather, equation (14) illustrates the formtion of exact delta beams by selecting $g_{\Delta a}(x)=x$, for a predetermined sigma or sum beam. This identity further illustrates the constraint imposed on the delta beams for a given predetermined sigma beam, as indicated in Table 7 provided hereinafter, e.g., 40 dB sigma will approximately correspond to 27.23 dB delta azimuth ($\bar{n}=5$).

TABLE 7

| Sum | Delta | Double-Delta |
|---|---|---|
| 40 | 27.2352 | 21.3093 |
| 45 | 30.917 | 24.2736 |
| 50 | 34.6569 | 27.3497 |
| 55 | 38.4379 | 30.4674 |

It will, likewise, now be appreciated that these constraints would not be imposed on an antenna aperture in accordance with the invention, that is where the beams are independent.

The desired relationship for the third and fourth horizontal beamformers, 230 and 240, respectively, to provide the desired predetermined electromagnetic field radiation patterns is obtained by a similar technique. Imposing the constraint of the third equation of [11] on the fourth equation of [11] and employing the functional form of the desired predetermined illumination distribution results in the following relationship.

$$\sum_{i_1=o}^{\bar{n}-1} \frac{B_{i_1} J_1(\mu_{i_1} p)}{p} = \sum_{i_2=o}^{\bar{n}-1} \frac{B_{i_2} J_2(\mu_{i_2} p)}{p^2}, \quad [15]$$

where again $g_{\Delta a}(x)$ equals x in the fourth equation of [11]. Curves 610 and 620 in FIG. 6 illustrate the resulting illumination distributions for the delta beam and the double-delta beam, respectively.

Figure 7:
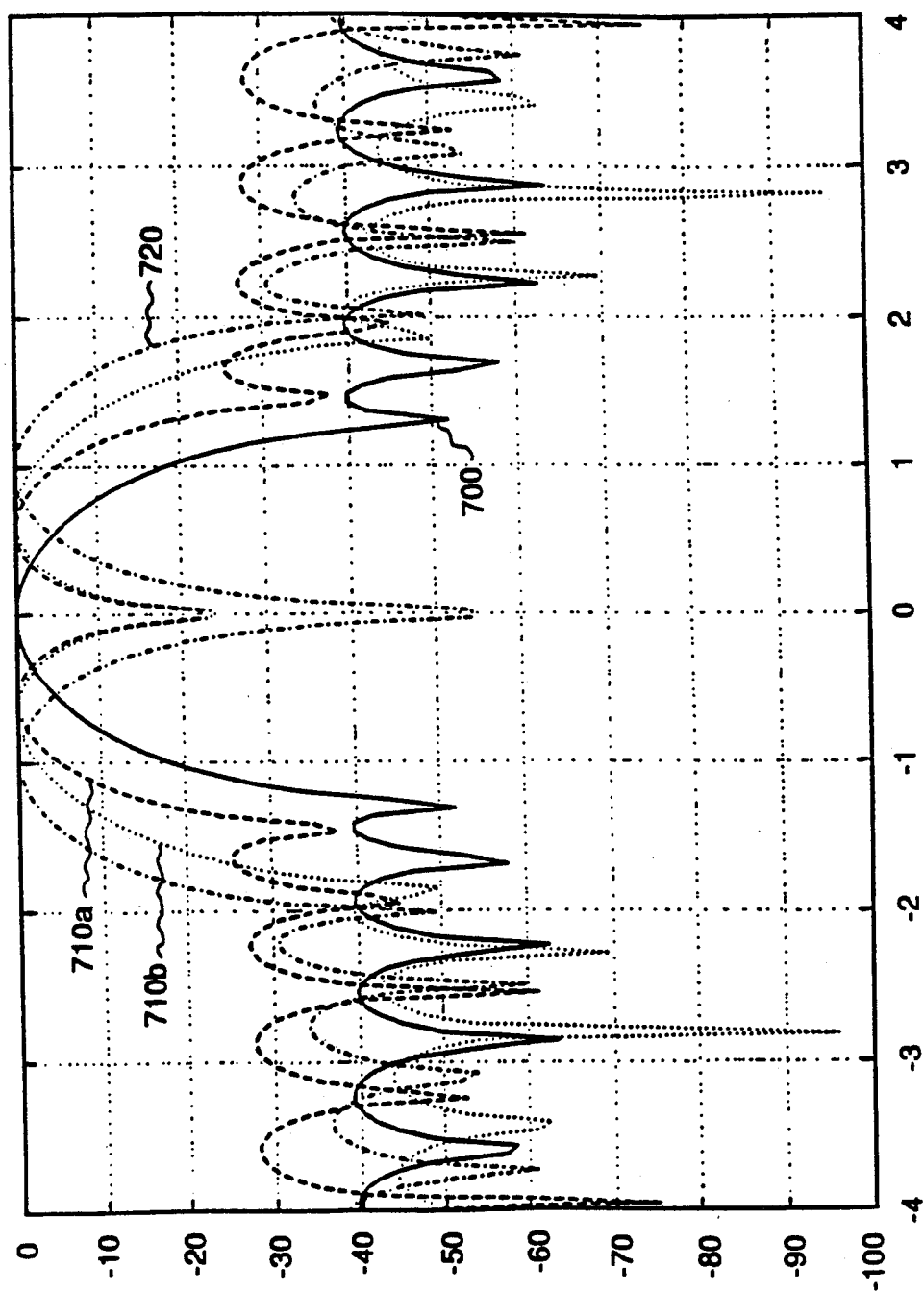
FIG. 7 is a graphical comparison of cross-sectional views of four predetermined electromagnetic field radiation patterns that may be formed by an embodiment of a radar antenna beamformer.

Equations [14] and [15] should now make clear to one skilled in the art a technique for obtaining the desired predetermined electromagnetic field patterns with a radar antenna beamformer in accordance with the present invention. For example, for the embodiment illustrated in FIG. 1, given two predetermined electromagnetic field radiation patterns and their associated illumination distributions, such as $g_{\Sigma e}(x,y)$ and $g_{\Delta e}(x,y)$, the remaining two electromagnetic field patterns may be formed in accordance with the previously provided equation in which $g_{\Delta a}(x)$ is taken as x (and $g_{\Sigma a}(x,y)$ is taken as 1). Again the identity of equation [15] illustrates the formation of an exact delta-delta beam by selecting $g_{\Delta a}(x)=x$, for a predetermined delta beam. This identity illustrates the constraints on a delta-delta beam for a given delta beam, e.g., 38.43 dB delta will approximately correspond to 30.46 dB double-delta, as provided in Table 7. Thus, if $g_1(x,y)$ is the illumination distribution corresponding to the first horizontal beamformer 210 or the third horizontal beamformer 230, respectively, and x and y define a substantially rectangular coordinate system in a plane substantially parallel to the plane of the aperture, then $g_2(x,y) = g_1(x,y) \cdot x$, where $g_2(x,y)$ is the illumination distribution respectively corresponding to the second or fourth horizontal beamformers, 220 or 240, respectively. As previously suggested, a predetermined sigma and delta-elevation beam may be realized to any specification but then constrains the delta-azimuth and double-delta beams due to orthogonal beamformers. FIG. 7 illustrates cross-sectional views of sum, 700, delta, 710a and 710b, and double-delta beams, 720, in which the respective curves have been normalized, formed by an embodiment of a radar antenna beamformer, such as shown in FIG. 5.

An additional advantage for such an antenna beamformer is illustrated by techniques for adaptive beamforming, such as may be employed to cancel or null a mainlobe jammer, as discussed hereinafter. Typically, adaptive beamforming may be performed to realize the following equation $$\frac{\Delta'_E}{\Sigma'} = \frac{\Delta_E - W_a \Delta_\Delta}{\Sigma - W_b \Delta_A} . \quad [16]$$

In accordance with equations [1] and [2b], this equation may alternatively be represented as $$\frac{\sum_{i=1}^{\bar{n}-1} B_i^E(J_1 \sin\phi) - W_a \sum_{i=1}^{\bar{n}-1} B_i^A(J_2 \sin\phi \cos\phi)}{\sum_{i=1}^{\bar{n}-1} B_i^\Sigma(J_o) - W_b \sum_{i=1}^{\bar{n}-1} B_i^A(J_1 \cos\phi)} ,$$

where various terms, including the integral sign, have been omitted for convenience and $B_i^\Delta$, $B_i^\Sigma$, $B_i^E$, and $B_i^A$ denote the coefficients to realize these particular electromagnetic field radiation patterns.

After simplification, this ratio reduces to $$(\sin\phi) \cdot \frac{1 - W_a \cos\phi}{1 - W_b \cos\phi} \cdot \frac{\sum_{i=1}^{\bar{n}-1} B_i^E(J_1)}{\sum_{i=1}^{\bar{n}-1} B_i^\Sigma(J_o)} ,$$

where equations [14] and [15] have been employed to remove common factors. A similar calculation would result for $\Delta'_A/\Sigma'$. As discussed hereinafter, the condition that $W_a = W_b$ may be achieved by the generalized separability condition $$\Sigma \Delta_\Delta = \Delta_A \Delta_E$$

Thus, it has now been shown that an embodiment of an antenna beamformer having the orthogonal beamforming structure disclosed herein will preserve the monopulse ratio in adaptive beamforming, such as typically occurs to cancel a mainlobe jammer, when used in conjunction with particular embodiments of a nonrectangular antenna aperture in accordance with the invention in which the generalized separability condition is achieved.

A plurality of predetermined electromagnetic field radiation patterns may be formed by the following method. First, a plurality of electromagnetic signals are received with a plurality of columns of antenna elements, such as 501, 502, 503, and 504 illustrated in FIG. 5. Next, received electromagnetic signals provided by the receiving elements for each column are combined and modulated in pairs, such as magic-T junctions 430 and 440, so that selected signals, after modulation, are substantially in phase or coherent with respect to each other to provide a plurality of combined signals and, likewise, after modulation, are substantially out of phase with respect to each other to provide a plurality of differenced signals. Next, a plurality of first and second vertical beam signals are formed, such as in vertical beamformers 400, by respectively superpositioning the combined signals and the differenced signals originating from each of the columns. Next, respective pairs of first vertical beam signals are respectively modulated and combined, such as by magic-T junctions 250 and 260, so that the selected pairs of vertical beams, after modulation, are substantially in phase with respect to each other to respectively provide a plurality of combined first vertical beam signals and, after modulation, are substantially out of phase with respect to each other to respectively provide a plurality of differenced first vertical beam signals. Next, respective pairs of second vertical beam signals are respectively modulated and combined, such as by magic-T junctions 270 and 280, so that the selected pairs of vertical beams, after modulation, are substantially in phase with respect to each other to respectively provide a plurality of combined second vertical beam signals and, likewise, are, after modulation, substantially out of phase with respect to each other to respectively provide a plurality of differenced second vertical beam signals. Four electromagnetic horizontal beams are formed, such as by horizontal beamformers 210, 220, 230, and 240, by respectively superpositioning the pluralities of combined first vertical beam signals, combined second vertical beam signals, differenced first vertical beam signals, and differenced second vertical beam signals, so that each horizontal beam forms a different predetermined electromagnetic field radiation pattern complying with the previously provided description.

An embodiment of a nonrectangular antenna aperture having mainlobe jammer nulling capability in accordance with the invention is now provided. As previously described, such a nonrectangular aperture may have the capability to respectively form a predetermined sum beam, delta-elevation beam, delta-azimuth beam, and delta-delta beam. Likewise, as will be appreciated by one skilled in the art, the direction of arrival for a target in elevation monopulse processing may be determined based on the ratio of the delta-elevation beam to the sum beam. Thus, for a nonrectangular antenna aperture to have mainlobe jammer nulling capability in elevation monopulse processing, in accordance with the invention, the delta-azimuth beam may be used to cancel the mainlobe jammer in the sum beam output signal and the delta-delta beam may be used to cancel the mainlobe jammer in the delta-elevation beam output signal. Likewise, for azimuth monopulse processing, the delta-elevation beam may be used to cancel the mainlobe jammer in the sum beam and the delta-delta beam may be used to cancel the mainlobe jammer in the delta-azimuth beam output signal. By this technique, the mainlobe jammer may be cancelled in the monopulse beam output signal to leave the monopulse ratio undistorted, as illustrated by the following equation where $\Sigma'$ and $\Delta'_E$ are the adaptive beam output signals.

$$\frac{\Delta'_E}{\Sigma'} = \frac{\Delta_E - W_a \Delta_\Delta}{\Sigma - W_b \Delta_A}$$

$$= \frac{\Delta_E(1 - W_a[\Delta_\Delta/\Delta_E])}{\Sigma(1 - W_b[\Delta_A/\Sigma])}$$
[16]

In equation [16], $W_a$ may correspond to $$\frac{E(\Delta_E \Delta^*)}{E(\Delta_\Delta \Delta^*)},$$

where * denotes the conjugate and E(·) denotes expected value. Likewise, $W_b$ may correspond to $$\frac{E(\Sigma \Delta_A^*)}{E(\Delta_A \Delta_A^*)}.$$

If Wa=Wb, then $$\frac{\Delta'_E}{\Sigma'} = \frac{\Delta_E}{\Sigma},$$

provided $\Sigma \Delta_\Delta = \Delta_A \Delta_E$. It may further be shown that where $\Sigma \Delta = \Delta_A \Delta_E$, $W_a \approx W_b$. Thus, provided the product of the sum and delta-delta beam is substantially equal to the product of the delta-azimuth beam and the delta-elevation beam at least within the mainbeam region, mainlobe jammer nulling capability may be achieved as previously illustrated. In monopulse processing, $W_a$ may correspond to a mainlobe jammer.

In the context of the present invention, the "product" of two beams, such as A and B, means $$A*B(x) = A(x)*B(x)$$

over a predetermined interval of x. Likewise, it will be appreciated that x, and consequently A and B, may be realized either as a discrete or a continuous parameter, depending upon the particular implementation of the beams. The ratio of the beams is similarly defined. In equation [16], adaptive beam output signals may be formed as described in *Main Beam Jammer Cancellation for Monopulse Sensors*, by S. P. Applebaum and R. Wasiewicz, Final Technical Report DTIC RADC-TR-86-267, December 1984, or in *Adaptive Antennas: Concepts and Performance*, written by R. T. Compton, Jr., and published by Prentice-Hall, Inc. (1988), both of which are herein incorporated by reference. Furthermore, a similar relationship may be derived for azimuth monopulse ratio processing as provided by the following equation.

$$\frac{\Delta'_A}{\Sigma'} = \frac{\Delta_A}{\Sigma} \frac{(1 - W_a[\Delta_\Delta/\Delta_A])}{(1 - W_b[\Delta_E/\Sigma])}.$$
[17]

The condition that the product of the sum beam and the delta-delta beam be substantially equal to the product of the delta-elevation beam and the delta-azimuth beam is referred to in the context of the invention as "the generalized separability property." As the previous description makes evident, it provides a necessary and sufficient condition to enable preservation of the monopulse ratio in adaptive beamforming while nulling or cancelling a mainlobe jammer. Thus, beams or electromagnetic field radiation patterns may be synthesized to meet this condition for any nonrectangular aperture to provide an aperture having mainlobe jammer nulling capability in accordance with the invention. This condition is directly contrasted with rectangular apertures in which the beams may each be separable in azimuth and elevation.

One embodiment of such a nonrectangular aperture is described hereinafter. Achieving the generalized separability condition is illustrated for a substantially circular antenna aperture, such as of the type illustrated in FIG. 1. However, it will be appreciated that this technique is not so limited in scope. The general technique may be applicable to other antenna apertures, such as an antenna array comprised of elements forming a convex shape or figure, such as a polygon, or a curvilinear closed figure, such as an ellipse. This includes a polygon having any number of sides, such as a triangle, a parallelogram, an octagon, or a hexagon, except a polygon having four sides in which all four angles are substantially equal, i.e., a rectangle. In the context of the invention, a "nonrectangular antenna aperture" refers to an antenna aperture having the convex shape or figure previously described. Examples of other such nonrectangular apertures are illustrated in FIGS. 10a, 10b, 10c, and 10d. It will be appreciated that other considerations may factor into determining the appropriately shaped aperture, such as cost, performance, or availability. Furthermore, the aperture may be configured so that the condition that the product of the sum beam and the delta-delta beam be substantially equal to the product of the delta-elevation beam and the delta-azimuth beam holds only substantially in the mainbeam region or, alternatively, also outside the mainbeam region, as explained hereinafter.

By way of illustration, for a circular antenna aperture, such as illustrated in FIG. 1, the predetermined electromagnetic field radiation patterns in general are described by the previously provided equations. For generalized separability, the following equation shall be satisfied over specified or predetermined regions:

$$f_0(u,\phi) f_2(u,\phi) = f_{11}(u,\phi) f_{12}(u,\phi)$$
[18], where $f_o$, $f_2$, $f_{11}$, and $f_{12}$ are different electromagnetic field radiation patterns. For a substantially circular aperture, $f_o$ is given by equation [12] with m=o, $f_2$ is given by equation [12] with cosine replaced by sine and m=2, $f_{12}$ is given by equation [12] with m=1, and $f_{12}$ is given by equation [12] with cosine replaced by sine and m=1.

In accordance with techniques previously described, the zeros and likewise the asymptotic zeros of the predetermined electromagnetic field patterns may be specified. Controlling the zeros and asymptotic zeros of the respective electromagnetic field radiation patterns leads to the result that the lefthand side and righthand side products in equation [18] will be essentially identical in particular regions, and in this particular instance, in the mainbeam region. Thus, satisfying equation [18] requires forming electromagnetic field radiation patterns so that the locations or positions in each pattern in which the electromagnetic field radiation pattern is substantially zero or null substantially coincide. It will be appreciated that these locations may be defined in cylindrical coordinates relative to a directional axis, as previously described, located substantially at the center of the aperture and having a predetermined elevation angle and a predetermined azimuth angle relative to the plane of the aperture.

For this particular embodiment of the invention, the desired separability condition may be accomplished in accordance with the equations previously provided, such as equations [14] and [15], with the additional equations provided hereinafter. Thus, for a substantially circular aperture, as described, a zero or null matching technique may be accomplished as follows. First, a sum beam for a given specification, i.e., ratio of mainlobe to sidelobes, number of predetermined sidelobe levels constrained, size of the aperture, frequency etc., is synthesized as previously described. After this synthesis, the desired $\overline{m}$ zeros in the central or mainlobe region are selected. Then the delta and double difference beams are respectively given by $$F_1(u,\phi) = j\cos(\phi) \sum_{i_1=0}^{i_1=\overline{m}} B_{i1} \frac{\pi}{(\mu_{i1}^2 - u^2)} (uJ_1(\mu_{i1}\pi)J'_1(u\pi)), \quad [19]$$

$$F_2(u,\phi) = \sin(2\phi) \sum_{i_2=0}^{i_2=\overline{m}} B_{i2} \frac{\pi}{(\mu_{i2}^2 - u^2)} (uJ_2(\mu_{i2}\pi)J'_2(u\pi)), \quad [20]$$

based on equation [12] and some trigonometric identities. These beams are synthesized by equations [19] and [20] for $B_{i1}$, $B_{i2}$, in such a fashion that the zeros of equations [19] and [20] are identical to those of the sum pattern synthesized and then determined for a selected value of $\phi$. It will now be appreciated that although by this technique the zeros coincide at one location of $\phi$, i.e., the selected value, the separability condition for a prescribed set of $\overline{m}$ zeros will be valid for all $\phi$, due to the identity $\sin 2\phi = 2 \cos \phi \sin \phi$.

It will now be appreciated that an embodiment of a nonrectangular aperture having mainlobe jammer nulling capability in accordance with the present invention may be specified by providing an electromagnetic field radiation pattern for any of the predetermined electromagnetic radiation patterns, i.e., sum beam, delta-elevation beam, delta-azimuth beam, or delta-delta beam. The zeros to realize the predetermined electromagnetic field radiation pattern are then selected as previously described. This, in turn, determines the locations of the zeros or nulls for the remaining beams and the remaining parameters of these beams may be numerically determined in accordance with the equations previously provided so that the desired relationships between the electromagnetic field radiation patterns are maintained. In accordance with the technique previously described, predetermined electromagnetic field radiation patterns have been determined or synthesized and the results are provided hereinafter in tables 8–11. It will be appreciated that these tables merely provide examples of embodiments of an antenna aperture and the scope of the invention is not limited to the embodiments provided by these tables.

TABLE 8

| | Example 1 | | | | | |
|---|---|---|---|---|---|---|
| TYPE | B0 | B1 | B2 | B3 | B4 | dB |
| SUM | 0.2026 | −2.6882 | −0.3918 | 0.0079 | 0.0016 | 55.0447 |
| DELTA | 0.7065 | 1.3789 | 0.0026 | 0.0395 | −0.0273 | 39.362 |
| DOUBLE | 1.2575 | 0.7282 | −0.0509 | −0.0013 | 0.0203 | 30.0161 |

TABLE 9

| | Example 2 | | | | | |
|---|---|---|---|---|---|---|
| TYPE | B0 | B1 | B2 | B3 | B4 | dB |
| SUM | 0.2026 | −2.8599 | −0.5732 | 0.0186 | −0.0005 | 57.9628 |
| DELTA | 0.6879 | 1.5742 | 0.1029 | 0.0058 | −0.0130 | 41.6967 |
| DOUBLE | 1.2029 | 0.9599 | −0.0715 | 0.0129 | −0.0003 | 31.5461 |

TABLE 10

| | Example 3 | | | | | |
|---|---|---|---|---|---|---|
| TYPE | B0 | B1 | B2 | B3 | B4 | dB |
| SUM | 0.2026 | −2.9373 | −0.6733 | 0.0070 | −0.0015 | 66.9176 |
| DELTA | 0.6800 | 1.6667 | 0.1831 | 0.0071 | −0.0093 | 50.0076 |
| DOUBLE | 1.1774 | 1.0797 | −0.0173 | 0.0225 | −0.0081 | 39.5572 |

TABLE 11

| | Example 4 | | | | | |
|---|---|---|---|---|---|---|
| TYPE | B0 | B1 | B2 | B3 | B4 | dB |
| SUM | 0.2026 | −3.0383 | −0.8014 | −0.0031 | −0.0015 | 73.1214 |
| DELTA | 0.6701 | 1.7854 | 0.2796 | −0.0010 | −0.0048 | 55.5449 |
| DOUBLE | 1.1453 | 1.2279 | 0.0331 | 0.0184 | −0.0096 | 44.4517 |

Figure 8A:
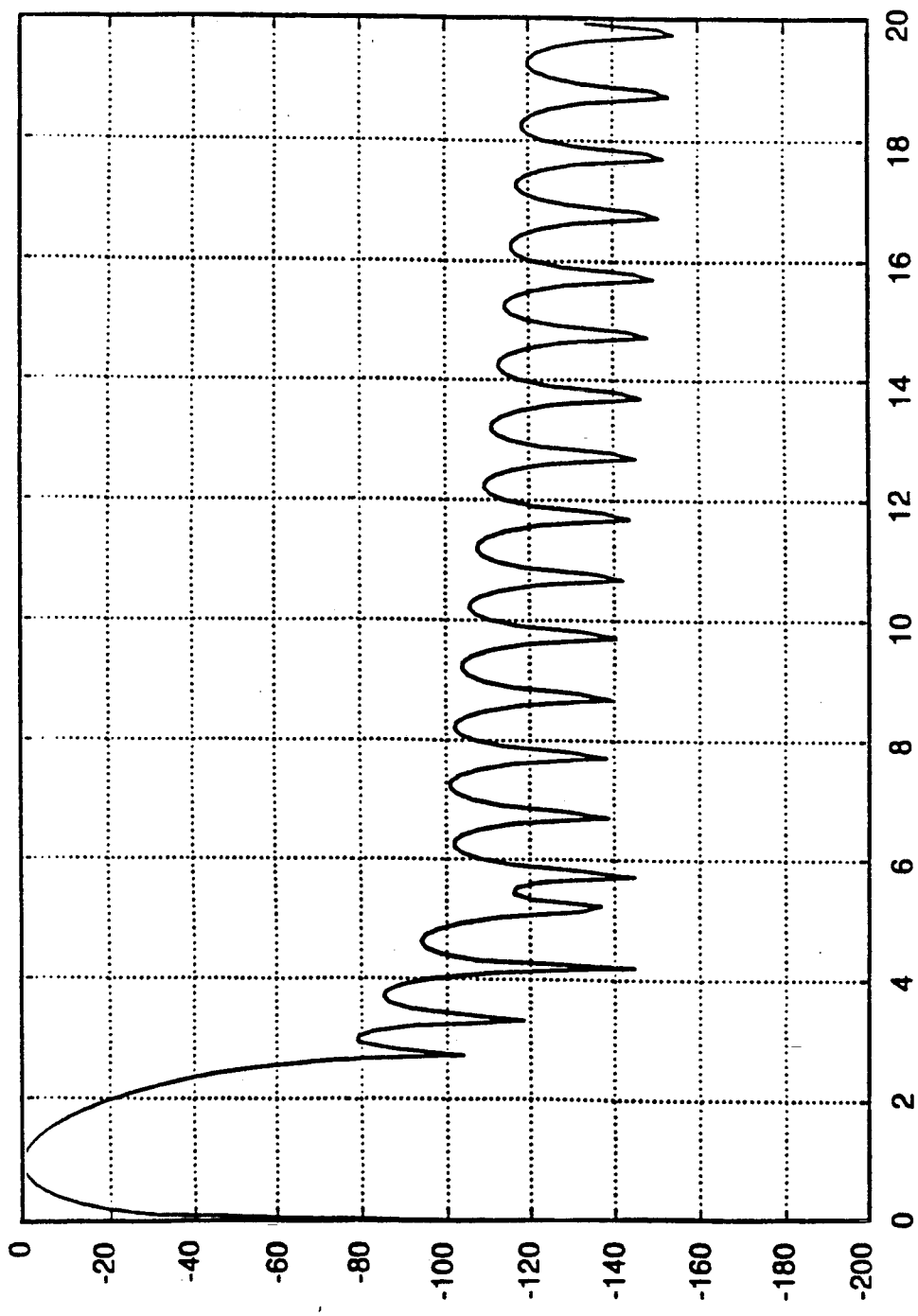
FIGS. 8a and 8b, respectively, are cross-sectional views of the product of electromagnetic field radiation patterns that may be formed by an embodiment of a nonrectangular antenna aperture having mainlobe jammer nulling capability in accordance with the invention.
Figure 8B:
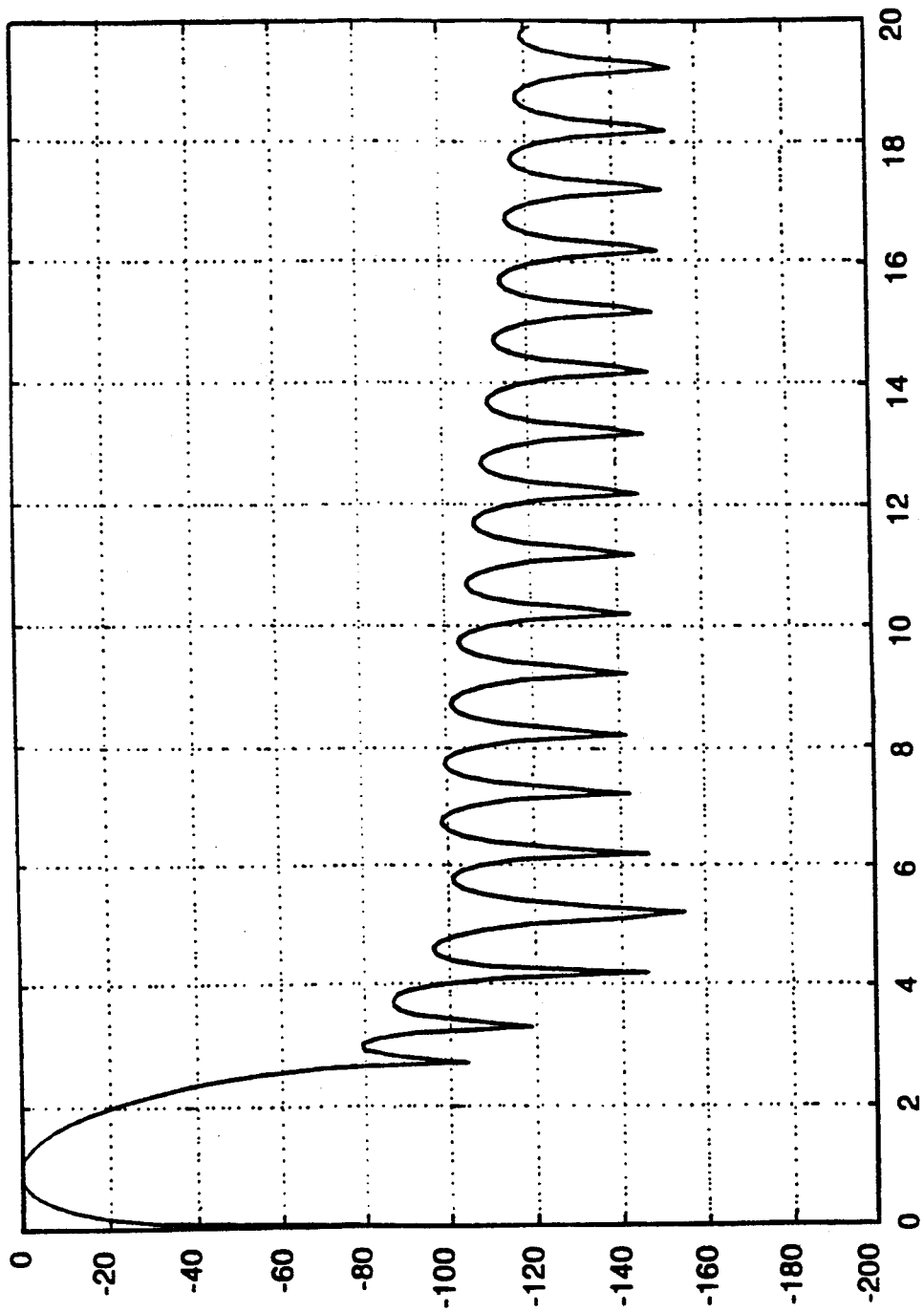
Figure 9A:
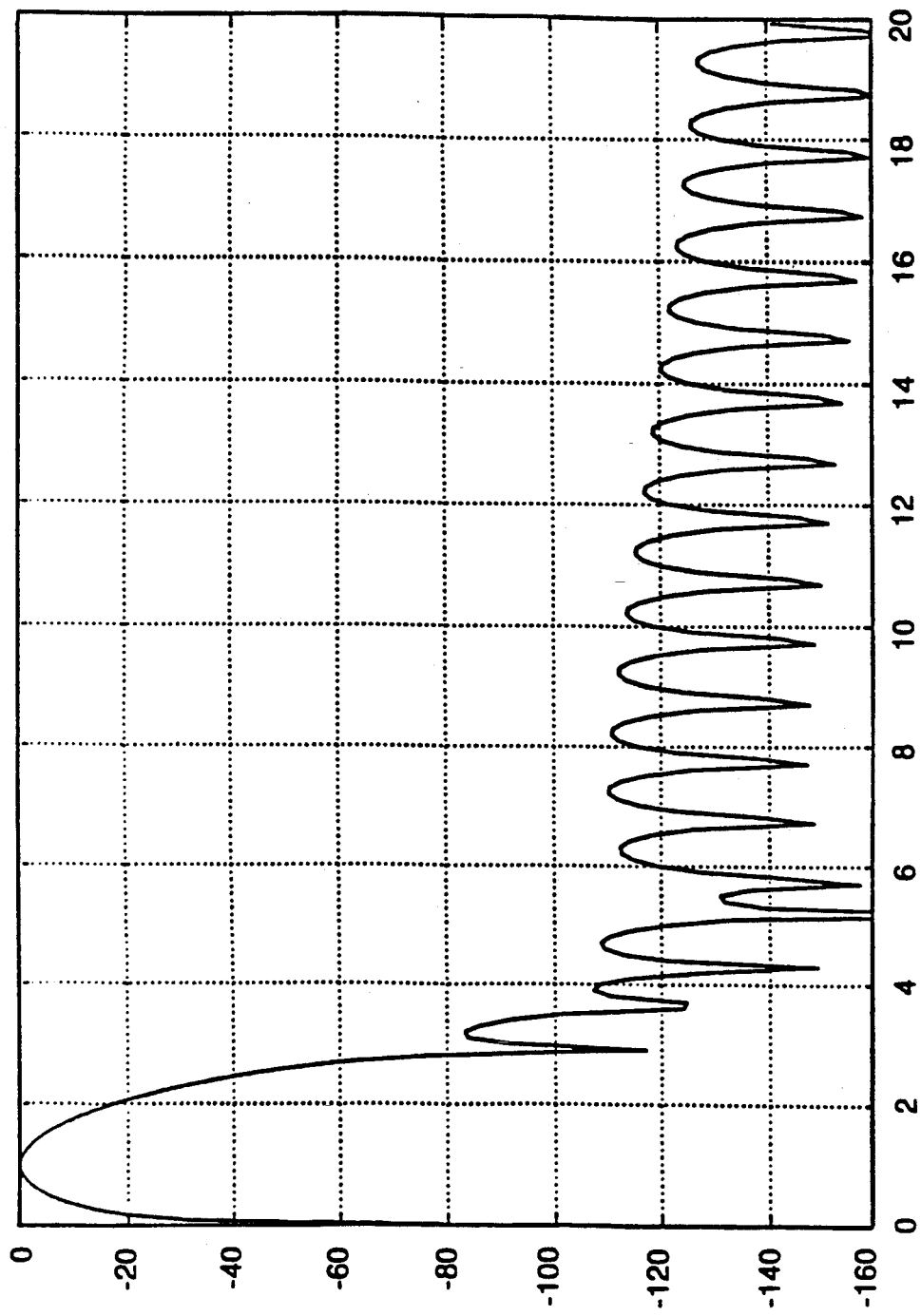
FIGS. 9a and 9b, respectively, are cross-sectional views of the product of electromagnetic field radiation patterns that may be formed by an embodiment of a nonrectangular antenna aperture having mainlobe jammer nulling capability in accordance with the invention.
Figure 9B:
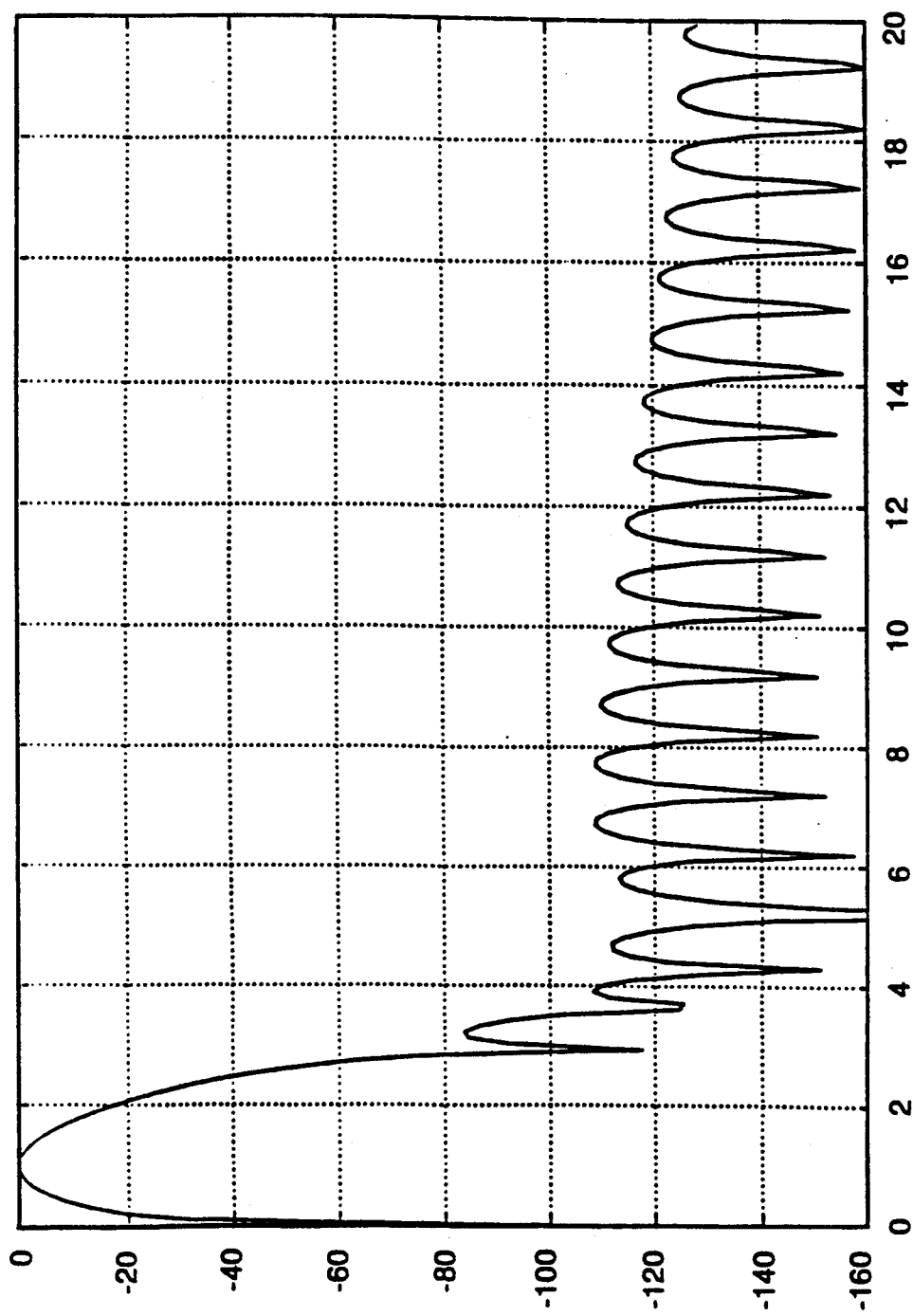

Likewise, FIGS. 8a, 8b, 9a, and 9b, respectively, illustrate plots of products of sum and delta-delta beams, and delta-elevation and delta-azimuth beams formed by different embodiments of a nonrectangular antenna aperture having mainlobe jammer capability in accordance with the invention. The horizontal axis corresponds to standard bandwidth and the vertical axis has been normalized so that the peak occurs at zero decibels. FIGS. 8a and 8b correspond to Table 8 and FIGS. 9a and 9b correspond to Table 9. These plots illustrate that separability may be satisfied by controlling the locations of the zeros of the beams, as discussed. However, the restrictions of equations [19] and [20] impose limits on the mainlobe-to-sidelobe ratios and the beamwidths that are realizable, such as illustrated by Table 7.

Although a nonrectangular antenna aperture having mainlobe jammer nulling capability in accordance with the invention has been illustrated with an embodiment comprising a substantially circular antenna aperture, as previously suggested, the technique of substantially matching the product of particular electromagnetic field radiation patterns, as illustrated by equation [18], may be applied to any nonrectangular antenna aperture to provide the desired mainlobe jammer nulling capability. Depending on the particular antenna aperture, either one of two approaches may be employed. In the first approach, an orthogonal decomposition procedure may be applied to the nonrectangular aperture to achieve the separability condition. The technique of orthogonal decomposition to achieve the separability condition has been illustrated for a substantially circular aperture using trigonometric and Bessel functions; however, other functions may be employed having similar orthogonal properties, such as fourier analysis or other known expansion techniques. Alternatively, in addition to matching the zeros or nulls for the electromagnetic field radiation patterns in the region of interest, such as the mainlobe, points between the nulls or zeros may be substantially matched or collocated, such as by a least squares technique, to provide the desired relationship between the field patterns embodied in equation [18]. Furthermore, although the technique of matching the nulls or zeros employed for a substantially circular aperture having mainlobe jammer nulling capability may likewise be successfully applied in other embodiments of a nonrectangular aperture having mainlobe jammer capability it is not generally required to achieve the generalized separability property or condition previously described.

While the invention has been described in detail herein in accordance with certain embodiments thereof, may modifications, substitutions, changes and equivalents will now occur to those skilled in the art. For example, an antenna aperture in accordance with the invention may be employed in environments other than radar. It is intended to cover all such modifications and changes as are within the true spirit and scope of the invention by means of the appended claims.

What is claimed is:

1. A nonrectangular aperture for a phased array radar antenna having the capability to form predetermined electromagnetic field radiation patterns, said aperture comprising:
    a first, second, third, and fourth quadrant, said quadrants substantially forming a surface having the capability for receiving electromagnetic signals having a component substantially in the direction of an axis oriented at a predetermined azimuth angle and a predetermined elevation angle with respect to the plane of said aperture, said quadrants further having the capability to modulate the component of the received electromagnetic signals substantially in accordance with predetermined illumination distributions so that said aperture is responsive to electromagnetic signals within predetermined electromagnetic field radiation patterns corresponding to the illumination distributions, the radiation patterns being defined as a function of angle in azimuth and elevation relative to said axis;
    the aperture having the capability to form a predetermined sum beam when said four quadrants modulate the received signals to be substantially in phase, a predetermined first difference beam when a first pair of successively adjacent quadrants modulate the received signals to be substantially out of phase with respect to the signals modulated by the remaining pair of successively adjacent quadrants, a predetermined second difference beam when a second successively adjacent pair of quadrants, other than said first pair and said remaining pair, modulate the received signals to be substantially out of phase with respect to the signals modulated by a second remaining pair of successively adjacent quadrants, and a predetermined double difference beam when a pair of diagonally adjacent quadrants modulate the received signals to be substantially out of phase with respect to the signals modulated by the remaining diagonally adjacent pair of quadrants; and
    the aperture further being adapted to form said beams so that a first product of said first and second difference beams is substantially equal to a second product of said sum beam and said double difference beams.

2. The aperture of claim 1, wherein each of said quadrants includes a plurality of antenna elements for receiving electromagnetic signals, each of said elements having the capability to modulate the component of the received electromagnetic signals.

3. The aperture of claim 2, wherein the configuration of said antenna elements in said aperture substantially forms a convex shape having a substantially elliptical perimeter.

4. The aperture of claim 3, wherein said convex shape has a substantially circular perimeter.

5. The aperture of claim 4, wherein the sum beam formed has a mainlobe region;
    the aperture having the capability to form said beams so that said first product is substantially equal to said second product only substantially in the mainlobe region.

6. The aperture of claim 5, wherein each antenna element comprises a dipole element, each respective dipole element having a respective predetermined position in said aperture.

7. The aperture of claim 6, wherein each of said beams have respective predetermined locations substantially along a direction substantially perpendicular to said axis in which the magnitude of the predetermined electromagnetic field radiation pattern is substantially zero, each of said respective locations in each beam having a corresponding respective location in the other beams, the respective corresponding predetermined substantially zero magnitude locations in said beams substantially coinciding.

8. The aperture of claim 4, wherein the illumination distributions are each substantially in accordance with the equation:

$$g(p,\phi) = \cos(m\phi) \sum_{i=0}^{\bar{n}-1} B_i J_m(\mu_i p),$$

where g is one of the distributions,
    p and $\phi$ are polar coordinates defining said aperture,
    $J_m$ is the Bessel function,
    the $B_i$ are predetermined coefficients selected in accordance with the predetermined electromagnetic field radiation pattern corresponding to the one distribution,
    the $\mu_i$ are predetermined zeros of the derivative of $J_m(\pi x)$,
    $\bar{n}-1$ is the number of predetermined sidelobe levels of the predetermined electromagnetic field radiation pattern corresponding to the one distribution, and m is a non-negative integer.

9. The aperture of claim 4, wherein the illumination distributions are each substantially in accordance with the equation $$g(p,\phi) = \sin(m\phi) \sum_{i=0}^{\bar{n}-1} B_i J_m(\mu_i p),$$

where g is one of the distributions, p and $\phi$ are polar coordinates defining said aperture, $J_m$ is the Bessel function, the $B_i$ are predetermined coefficients selected in accordance with the predetermined electromagnetic field radiation pattern corresponding to the one distribution, the $\mu_i$ are predetermined zeros of the derivative of $J_m(\pi,x)$, $\bar{n}-1$ is the number of predetermined sidelobe levels of the predetermined electromagnetic field radiation pattern corresponding to the one distribution, and m is a non-negative integer.

10. The aperture of claim 2, wherein the configuration of said antenna elements in said aperture substantially forms a convex polygon.

11. The aperture of claim 10, wherein said convex polygon has five sides.

12. The aperture of claim 10, wherein said convex polygon has six sides.

13. The aperture of claim 10, wherein said convex polygon has eight sides.

14. A nonrectangular aperture for a phased array radar antenna having the capability to form predetermined electromagnetic field radiation patterns, said aperture comprising:

a first, second, third, and fourth quadrant, said quadrants substantially forming a plane, each quadrant including a plurality of antenna elements for radiating electromagnetic signals having a component substantially in the direction of an axis oriented at a predetermined azimuth angle and a predetermined elevation angle with respect to the plane of said aperture, each element having the capability to modulate the component of the electromagnetic signals to be radiated substantially in accordance with predetermined illumination distributions so that said aperture radiates electromagnetic signals within predetermined electromagnetic field radiation patterns corresponding to the illumination distributions, said radiation patterns being defined as a function of angle in azimuth and elevation relative to said axis;

the aperture having the capability to form a predetermined sum beam when said four quadrants modulate the signals so as to radiate substantially in phase, a predetermined first difference beam when a first pair of successively adjacent quadrants modulate the signals so as to radiate substantially out of phase with respect to the signals modulated by the remaining pair of successively adjacent quadrants, a predetermined second difference beam when a second successively adjacent pair of quadrants, other than said first pair and said remaining pair, modulate the signals so as to radiate substantially out of phase with respect to the signals modulated by a second remaining pair of successively adjacent quadrants, and a predetermined double difference beam when a pair of diagonally adjacent quadrants modulate the signals so as to radiate substantially out of phase with respect to the signals modulated by the remaining diagonally adjacent pair of quadrants; and the aperture further being adapted to form said beams so that a first product of said first and second difference beams substantially equals a second product of said sum beam and said double difference beam.

15. A method of forming predetermined electromagnetic field radiation patterns with a nonrectangular antenna aperture, said aperture comprising a first, second, third, and fourth quadrant substantially forming a plane, said method comprising the step of propagating electromagnetic signals from said four quadrants in accordance with predetermined illumination distributions to form corresponding predetermined electromagnetic field patterns, the propagated signals having a component substantially in the direction of an axis oriented at a predetermined azimuth angle and a predetermined elevation angle with respect to the plane of said aperture, said radiation patterns being defined as a function of azimuth and elevation relative to said axis;

the step of propagating comprising the steps of:

propagating the signals from said four quadrants substantially in phase to form a predetermined sum beam;

propagating the signals from a first pair of successively adjacent quadrants substantially out of phase with respect to the signals from the remaining pair of successively adjacent quadrants to form a predetermined first difference beam;

propagating the signals from a first pair of successively adjacent quadrants, other than said first pair and said remaining pair, substantially out of phase with respect to the signals from a second remaining pair of successively adjacent quadrants to form a predetermined second difference beam;

propagating the signals from a pair of diagonally adjacent quadrants substantially out of phase with respect to the signals from the remaining pair of diagonally adjacent quadrants to form a double difference beam; and propagating the signals to form said beams so that a first product of said sum beam and said double difference beam substantially equals a second product of said first difference beam and said second difference beam.

16. A method of forming predetermined electromagnetic field radiation patterns with a nonrectangular antenna aperture, said aperture comprising a first, second, third, and fourth quadrant substantially forming a plane, said method comprising the steps of:

receiving electromagnetic signals over the surface of said aperture, the received signals having a component substantially in the direction of an axis oriented at a predetermined azimuth angle and a predetermined elevation angle with respect to the plane of said aperture; and modulating the amplitude and phase of the component of said received signals substantially in accordance with predetermined illumination distributions to form corresponding predetermined radiation patterns defined as a function of azimuth and elevation relative to said axis;

the modulating step comprising the steps of:

modulating the signals from said four quadrants to be substantially in phase to form a predetermined sum beam;

modulating the signals so that the signals from a first pair of successively adjacent quadrants are substantially out of phase with respect to the signals from the remaining pair of successively adjacent quadrants to form a predetermined first difference beam;

modulating the signals so that the signals from a first pair of successively adjacent quadrants, other than said first pair and said remaining pair, are substantially out of phase with respect to the signals from a second remaining pair of successively adjacent quadrants to form a predetermined second difference beam;

modulating the signals so that the signals from a pair of diagonally adjacent quadrants are substantially out of phase with respect to the signals from the remaining pair of diagonally adjacent quadrants to form a double difference beam; and modulating the signals so that a first product of said sum beam and said double difference beam substantially equals a second product of said first difference beam and said second difference beam.

17. The method of claim 16, wherein the sum beam has a mainlobe region, and wherein the last recited step of modulating comprises modulating the signals so that said first product substantially equals said second product only substantially in the mainlobe region.

18. The method of claim 17, wherein the step of receiving comprises receiving electromagnetic signals over the surface of a substantially elliptical antenna aperture.

19. The method of claim 18, wherein said substantially elliptical antenna aperture is substantially circular.

20. The method of claim 17, wherein the step of receiving comprises receiving electromagnetic signals over the surface of a substantially hexagonal antenna aperture.

21. The method of claim 17, wherein the step of receiving comprises receiving electromagnetic signals over the surface of a substantially octagonal antenna aperture.

22. The method of claim 17, wherein the step of receiving comprises receiving electromagnetic signals over the surface of a substantially pentagonal antenna aperture.

23. The method of claim 19, wherein the first recited step of modulating comprises modulating the signals so that each of said beams have respective predetermined locations substantially along a direction substantially perpendicular to said axis in which the magnitude of the predetermined electromagnetic field radiation pattern is substantially zero, each of said respective locations in each beam having a corresponding respective location in the other beams, the respective corresponding predetermined substantially zero magnitude locations in said beams substantially coinciding.

* * * * *